United States Patent
Freeman et al.

(10) Patent No.: US 9,914,179 B2
(45) Date of Patent: *Mar. 13, 2018

(54) SELF SERVICE KEY DUPLICATING MACHINE WITH AUTOMATIC KEY MODEL IDENTIFICATION SYSTEM

(71) Applicant: Minute Key Inc., Boulder, CO (US)

(72) Inventors: Daniel Freeman, Calabasas, CA (US); Ari Freeman, San Rafael, CA (US)

(73) Assignee: MINUTE KEY INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,060

(22) Filed: Oct. 22, 2015

(65) Prior Publication Data

US 2016/0059324 A1 Mar. 3, 2016

Related U.S. Application Data

(60) Continuation of application No. 13/622,036, filed on Sep. 18, 2012, now Pat. No. 9,199,318, which is a
(Continued)

(51) Int. Cl.
*B23C 3/35* (2006.01)
*B23Q 35/08* (2006.01)

(52) U.S. Cl.
CPC .............. *B23C 3/35* (2013.01); *B23Q 35/08* (2013.01); *B23C 2230/08* (2013.01);
(Continued)

(58) Field of Classification Search
CPC ............ B23C 2235/12; B23C 2235/24; B23C 2235/32; B23C 2235/41; B23C 3/35
See application file for complete search history.

(56) References Cited

U.S. PATENT DOCUMENTS 1,461,171 A 7/1923 Barnes
1,752,468 A 4/1930 Stull
(Continued)

FOREIGN PATENT DOCUMENTS

EA 200801858 12/2008
ES 2017240 1/1991
(Continued)

OTHER PUBLICATIONS

Canadian Intellectual Property Office, Office Action dated Oct. 31, 2013 for Serial No. 2797774, entitled, "Fully Automatic Key Model Identification System", 2 pages.
(Continued)

*Primary Examiner* — Daniel Howell
(74) *Attorney, Agent, or Firm* — Jones Day

(57) ABSTRACT

A method of duplicating a key includes receiving a master key in a key duplicating machine. The machine automatically detects a cross sectional profile of the master key. The machine automatically determines, based on the detected cross sectional profile, a type and model of the master key. The machine automatically selects a key blank that matches the type and model of the master key, and then automatically cuts the selected key blank to duplicate a key tooth pattern of the master key.

18 Claims, 28 Drawing Sheets

Related U.S. Application Data division of application No. 11/998,101, filed on Nov. 28, 2007, now Pat. No. 8,287,215.

(60) Provisional application No. 60/867,796, filed on Nov. 30, 2006, provisional application No. 60/867,403, filed on Nov. 28, 2006.

(52) U.S. Cl.
CPC ...... *B23C 2235/24* (2013.01); *B23C 2235/28* (2013.01); *B23C 2235/32* (2013.01); *Y10T 409/30616* (2015.01); *Y10T 409/300952* (2015.01); *Y10T 409/301008* (2015.01); *Y10T 409/301064* (2015.01); *Y10T 409/306048* (2015.01)

(56) References Cited

U.S. PATENT DOCUMENTS

| | | | |
|---|---|---|---|
| 2,038,949 A | 4/1936 | Mintz | |
| 2,148,667 A | 2/1939 | Yoskowitz | |
| 2,244,985 A | 6/1941 | Armitage et al. | |
| 2,266,864 A | 12/1941 | Hausknecht | |
| 2,398,659 A | 4/1946 | Mead | |
| 2,582,012 A | 1/1952 | Currier | |
| 2,809,566 A | 10/1957 | Orchard | |
| 3,116,665 A | 1/1964 | Reisner | |
| 3,245,149 A | 4/1966 | Haggstrom | |
| 3,323,420 A | 6/1967 | Roxburgh | |
| 3,358,561 A | 12/1967 | Roxburgh et al. | |
| 3,413,892 A | 12/1968 | Casey et al. | |
| 3,442,174 A | 5/1969 | Weiner et al. | |
| 3,625,111 A | 12/1971 | Carlo et al. | |
| 3,675,536 A | 7/1972 | Hungerford et al. | |
| 3,792,639 A | 2/1974 | Richens et al. | |
| 3,796,130 A | 3/1974 | Gartner | |
| 3,810,416 A | 5/1974 | Nelms, Jr. | |
| 3,865,011 A | 2/1975 | Patriquin | |
| 3,870,136 A | 3/1975 | Voegeli | |
| 3,880,321 A | 4/1975 | Braginetz | |
| 3,884,330 A | 5/1975 | Chalabian | |
| 3,956,968 A | 5/1976 | Crasnianski | |
| 3,958,081 A | 5/1976 | Ehrsam et al. | |
| 3,962,539 A | 6/1976 | Ehrsam et al. | |
| 3,978,764 A | 9/1976 | Patriquin | |
| 4,012,991 A | 3/1977 | Uyeda | |
| 4,051,748 A | 10/1977 | Sherman | |
| 4,090,303 A | 5/1978 | Uyeda | |
| 4,092,806 A | 6/1978 | Wich | |
| 4,117,763 A | 10/1978 | Uyeda | |
| 4,203,693 A | 5/1980 | Schwartz et al. | |
| 4,338,849 A | 7/1982 | Turner | |
| 4,423,655 A | 1/1984 | Turner | |
| 4,426,179 A | 1/1984 | Jefferson | |
| 4,614,465 A | 9/1986 | Wu | |
| 4,646,590 A | 3/1987 | Jones | |
| 4,663,721 A | 5/1987 | Herscovici | |
| 4,666,351 A | 5/1987 | Marchal | |
| 4,687,389 A | 8/1987 | Santii et al. | |
| 4,709,511 A | 12/1987 | Camillo | |
| 4,741,652 A | 5/1988 | Marchal | |
| 4,780,032 A | 10/1988 | Uyeda et al. | |
| 4,878,630 A | 11/1989 | Schmid | |
| 4,898,504 A | 2/1990 | Agius et al. | |
| 4,899,391 A | 2/1990 | Cimino et al. | |
| 4,929,129 A | 5/1990 | Dickson | |
| 4,937,623 A | 6/1990 | Nishimori et al. | |
| 4,969,782 A | 11/1990 | Castain | |
| 5,122,018 A | 6/1992 | Zion | |
| 5,127,532 A | 7/1992 | Cimino et al. | |
| 5,128,531 A | 7/1992 | Fadel | |
| 5,133,127 A | 7/1992 | Bush | |
| 5,144,452 A | 9/1992 | Abuyama | |
| 5,167,171 A | 12/1992 | Heredia | |
| 5,171,112 A | 12/1992 | Roland | |
| 5,201,048 A | 4/1993 | Coulter et al. | |
| 5,259,708 A | 11/1993 | Brioe | |
| 5,271,698 A | 12/1993 | Heredia et al. | |
| 5,314,274 A | 5/1994 | Heredia et al. | |
| 5,331,474 A | 7/1994 | Lee | |
| 5,351,409 A | 10/1994 | Heredia | |
| 5,441,369 A | 8/1995 | Foscan et al. | |
| 5,443,339 A | 8/1995 | Heredia et al. | |
| 5,493,880 A | 2/1996 | Jang | |
| 5,496,138 A | 3/1996 | Drori | |
| 5,538,374 A | 7/1996 | Cole et al. | |
| 5,556,240 A | 9/1996 | Almblad | |
| 5,569,003 A | 10/1996 | Goldman et al. | |
| 5,607,267 A | 3/1997 | Heredia et al. | |
| 5,627,549 A | 5/1997 | Park | |
| 5,660,509 A | 8/1997 | Cole et al. | |
| 5,676,504 A | 10/1997 | Mueller et al. | |
| 5,807,042 A | 9/1998 | Almblad et al. | |
| 5,833,406 A | 11/1998 | Chies et al. | |
| 5,906,365 A | 5/1999 | Wu | |
| 5,908,273 A | 6/1999 | Titus et al. | |
| 5,951,218 A | 9/1999 | Wu | |
| 5,964,554 A | 10/1999 | Drori | |
| 5,997,224 A | 12/1999 | Beauregard et al. | |
| 6,064,747 A | 5/2000 | Wills et al. | |
| 6,065,911 A | 5/2000 | Almblad et al. | |
| 6,152,662 A | 11/2000 | Titus et al. | |
| 6,185,311 B1 | 2/2001 | Yanovsky et al. | |
| 6,406,227 B1 | 6/2002 | Titus et al. | |
| 6,449,381 B1 | 9/2002 | Yanovsky et al. | |
| 6,543,972 B1 | 4/2003 | Cimino | |
| 6,588,995 B2 | 7/2003 | Wills et al. | |
| 6,595,045 B1 | 7/2003 | Fuglewicz et al. | |
| 6,602,030 B1 | 8/2003 | Markbreit | |
| 6,606,602 B1 | 8/2003 | Kolls | |
| 6,641,339 B2 | 11/2003 | Chies et al. | |
| 6,647,308 B1 | 11/2003 | Prejean | |
| 6,782,725 B2 | 8/2004 | Linares | |
| 6,839,449 B1 | 1/2005 | Campbell et al. | |
| 6,895,100 B1 | 5/2005 | Pacenzia et al. | |
| 7,114,894 B2 | 10/2006 | Mueller et al. | |
| 7,218,991 B2 | 5/2007 | Walker et al. | |
| 7,331,521 B2 | 2/2008 | Sorenson et al. | |
| 7,346,562 B2 | 3/2008 | Inoue | |
| 7,890,878 B2 | 2/2011 | Bass et al. | |
| 7,891,919 B2 | 2/2011 | Bass et al. | |
| 7,894,935 B1 | 2/2011 | Hagen et al. | |
| 8,287,215 B2 | 10/2012 | Freeman et al. | |
| 8,682,468 B2 | 3/2014 | Marsh et al. | |
| 8,688,579 B1 | 4/2014 | Ethington | |
| 8,979,446 B2 * | 3/2015 | Freeman | B23C 3/35 409/81 |
| 9,199,318 B2 * | 12/2015 | Freeman | B23C 3/35 |
| 2002/0031251 A1 | 3/2002 | Campbell | |
| 2003/0033054 A1 | 2/2003 | Yamazaki | |
| 2004/0199426 A1 | 10/2004 | Prorock | |
| 2005/0043011 A1 | 2/2005 | Murray et al. | |
| 2005/0135891 A1 | 6/2005 | Ryai, Sr. et al. | |
| 2006/0048553 A1 | 3/2006 | Almquist | |
| 2007/0050266 A1 | 3/2007 | Barber et al. | |
| 2007/0136125 A1 | 6/2007 | Godwin et al. | |
| 2007/0224008 A1 | 9/2007 | Bass et al. | |
| 2008/0145163 A1 | 6/2008 | Freeman et al. | |
| 2009/0257091 A1 | 10/2009 | Shelton et al. | |
| 2010/0057871 A1 | 3/2010 | Kaplan et al. | |
| 2011/0297691 A1 | 12/2011 | Freeman | |
| 2013/0173044 A1 | 7/2013 | Marsh | |
| 2013/0294857 A1 | 11/2013 | Bass | |
| 2014/0064597 A1 | 3/2014 | Fagan | |

FOREIGN PATENT DOCUMENTS

| | | |
|---|---|---|
| JP | 4-502885 | 5/1992 |
| JP | 9-216112 | 8/1997 |
| RU | 82904 | 5/2009 |
| RU | 87030 | 9/2009 |
| WO | 9505609 A2 | 2/1995 |
| WO | 9948065 | 9/1999 |

(56) References Cited

FOREIGN PATENT DOCUMENTS

| WO | 9950801 | 10/1999 |
|---|---|---|
| WO | 2004012893 | 2/2004 |
| WO | 2008066867 | 6/2008 |

OTHER PUBLICATIONS

International Search Report, dated Nov. 9, 2012, issued in International Patent Application No. PCT/US2012/040656 (3 pages).
Written Opinion, dated Nov. 9, 2012, issued in International Patent Application No. PCT/US2012/040656 (4 pages).
International Search Report, dated Nov. 29, 2011, issued in International Patent Application No. PCT/US2011/039128 (4 pages).
Written Opinion, dated Nov. 29, 2011. issued in International Patent Application No. PCT/US2011/039128 (5 pages).
International Search Report, Application No. PCT /US07 /24522, dated Aug. 18, 2008, (4 pages).
Written Opinion, Application No. PCT/US07/24522, dated Aug. 18, 2008, (15 pages).
Office Action dated Mar. 10, 2017 from related/corresponding U.S. Appl. No. 15/191,071, filed Jun 23, 2016.
Final Rejection dated Mar. 7, 2017. from related/corresponding U.S. Appl. No. 13/964,017 filed Aug. 9, 2013.
Final Rejection dated Aug. 24, 2015 from U.S. Appl. No. 13/961,519, filed Aug. 7, 2013.
Office Action dated Feb. 10, 2015 from U.S. Appl. No. 13/961,519, filed Aug. 7, 2013.
Office Action dated Oct. 1, 2014 from U.S. Appl. No. 13/153,065, filed Jun. 3, 2011.
2nd Examination Report dated Sep. 5, 2014 from Australian Patent Appl. No. 2007325754.
Office Action dated Sep. 3, 2014 from Canadian Patent Appl. No. 2797774.
Office Action dated Jun. 13, 2014 from Canadian Patent Appl. No. 2801424.
Examination Report dated May 17, 2014 from Australian Patent Appl. No. 2011261228.
Office Action dated Mar. 7, 2017 from U.S. Appl. No. 13/964,017, filed Aug. 9, 2013.
Office Action dated Jun. 29, 2017 from U.S. Appl. No. 13/964,017, filed Aug. 9, 2013.
Final Rejection dated Nov. 20, 2017 from U.S Appl. No. 13/964,017, filed Aug. 9, 2013.
Office Action dated Jul. 13, 2016 from U.S. Appl. No. 13/964,017, filed Aug. 9, 2013.
Office Action dated Apr. 26, 2013 from U.S. Appl. No. 13/155,994, filed Jun. 8, 2011.
Supplemental European Search Report dated Aug. 12, 2016 from European Patent Appl. No. 07862307.1.
Cherkassky, Irene "The e-volution of wireless vending", Beverage World, Feb. 15, 2000.
Kasavana, Michael, Kiosk technology will give vending new capabilities: Automatic Merchandiser, Dec. 1, 2007.
Examination Report dated Aug. 6, 2013 from Australia Patent Appl. No. 2007325754.
Canadian Intellectual Property Office, Office Action dated Nov. 18, 2013 for Serial No. 2801424, entitled "Fully Automatic Self-Service Key Duplicating Kiosk", 4 pages.

\* cited by examiner

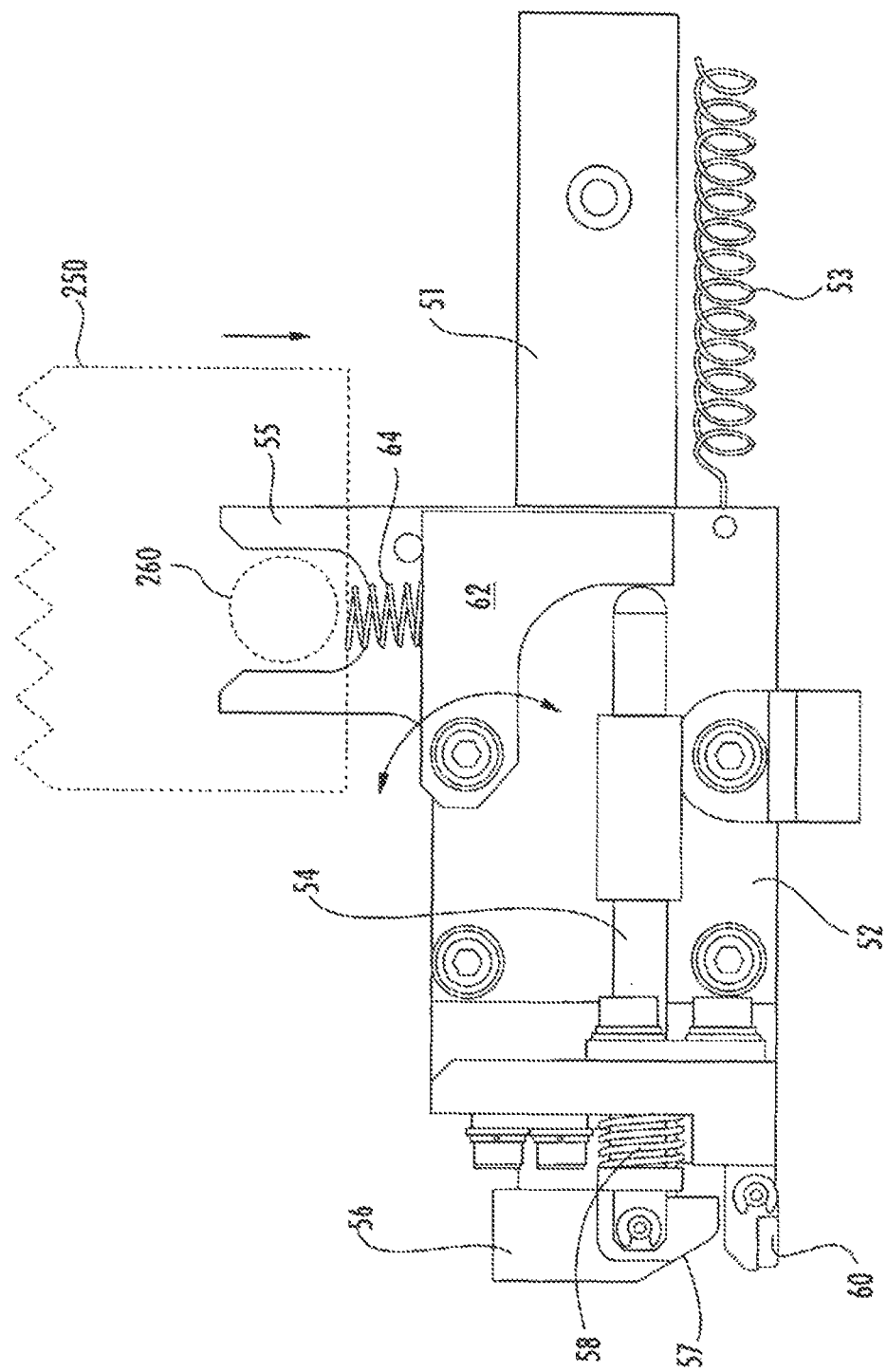

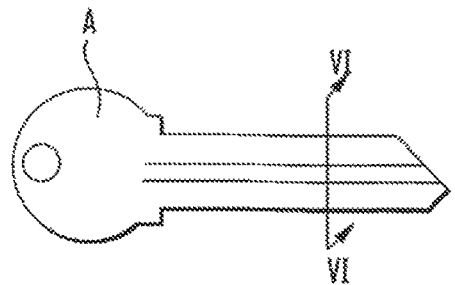
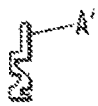
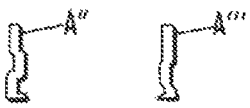
FIG. 6A  FIG. 6B  FIG. 6C  FIG. 6D
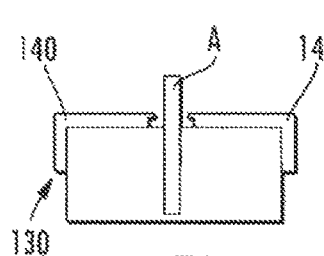
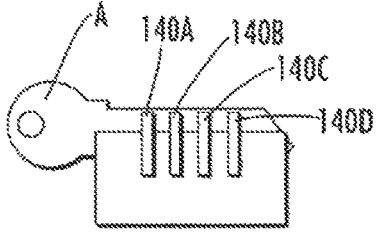
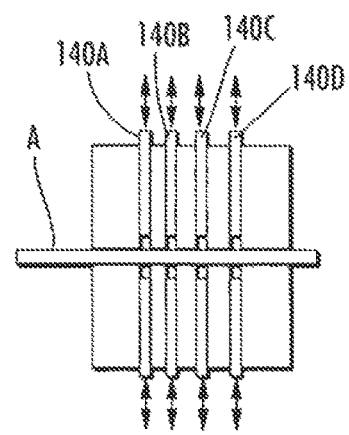
FIG. 7A  FIG. 7B  FIG. 7C
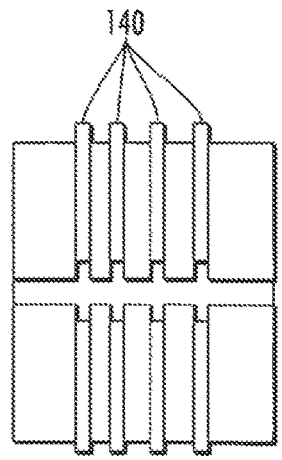
FIG. 7D

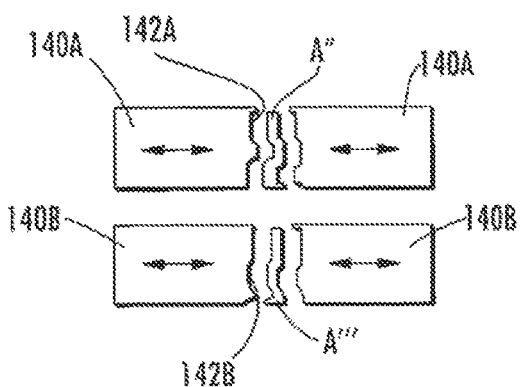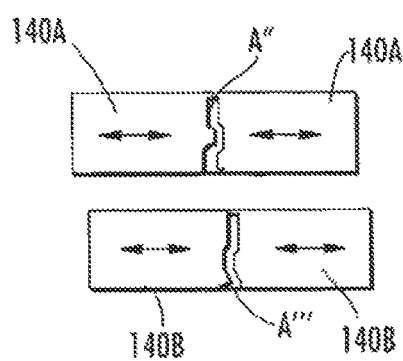
FIG. 8A  FIG. 8B
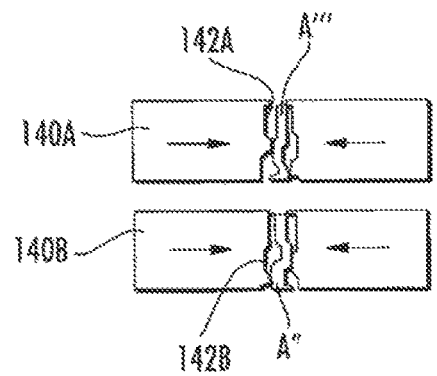
FIG. 9

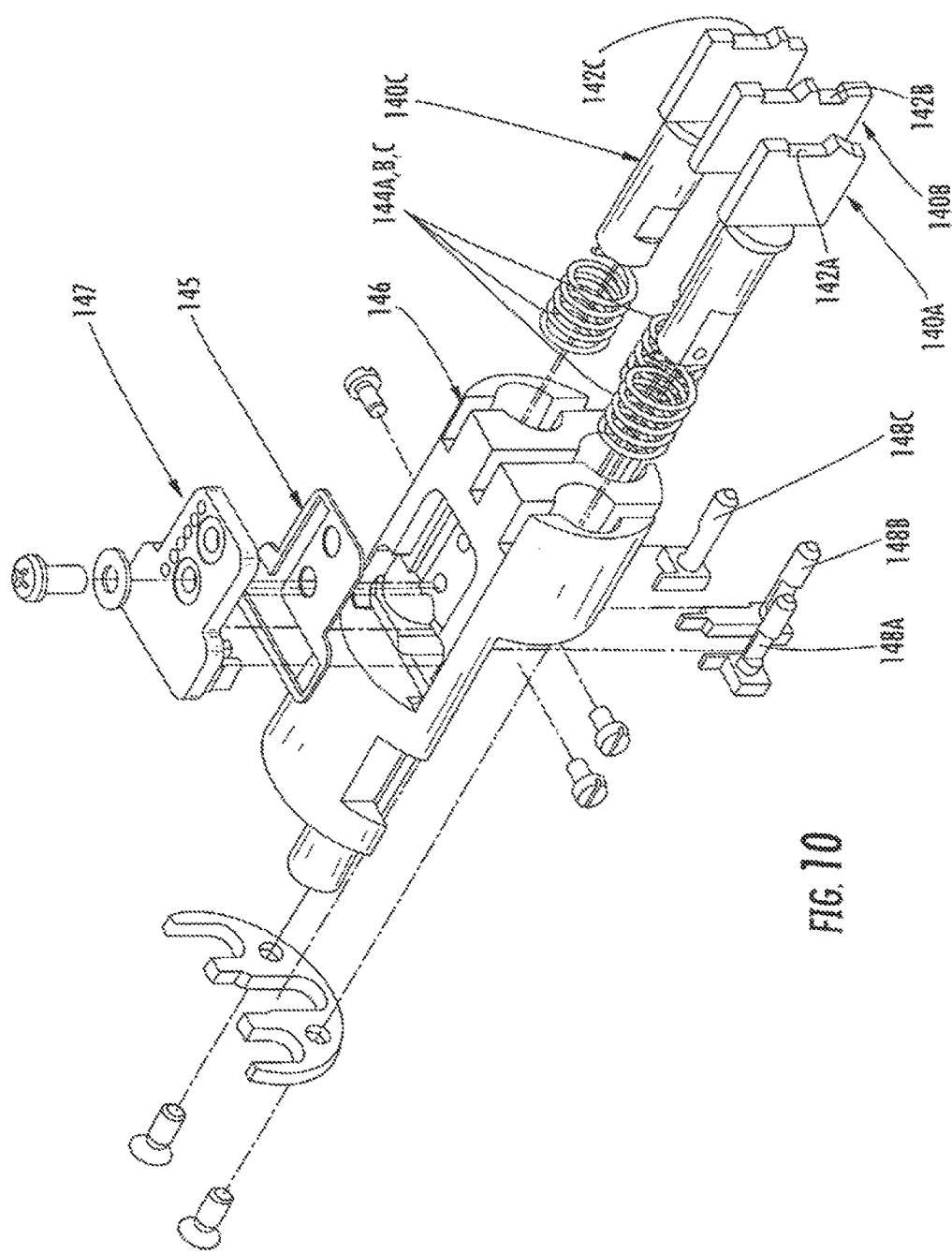

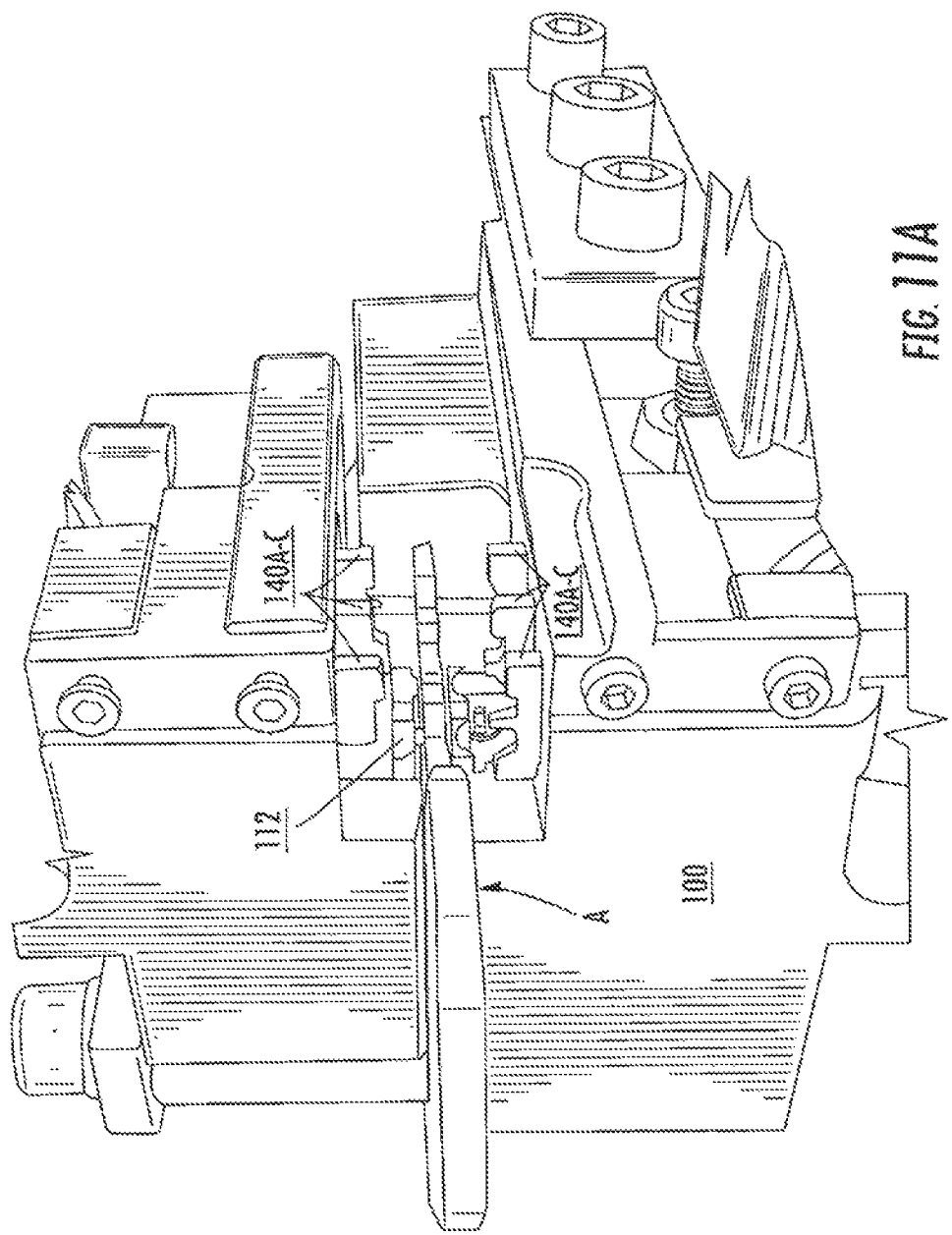

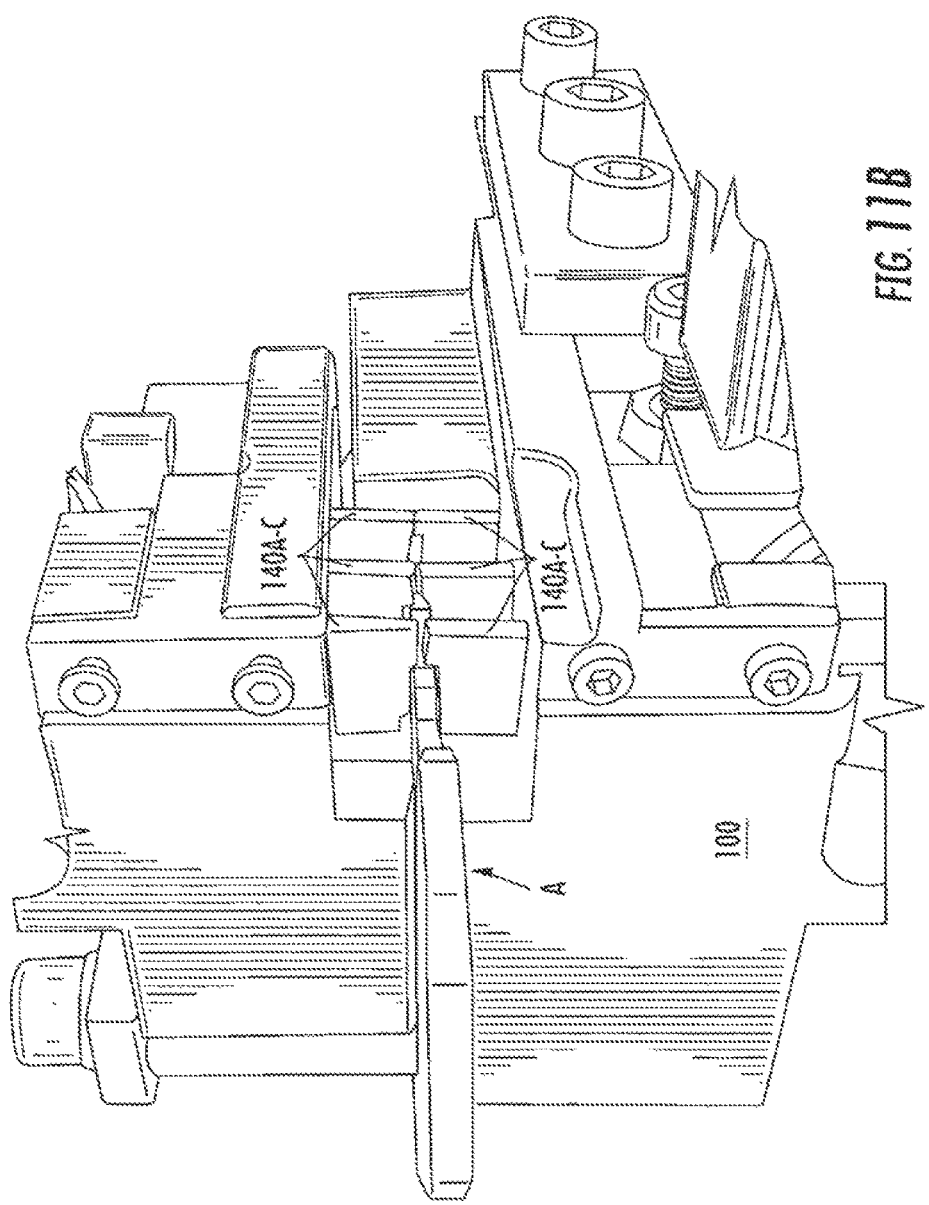

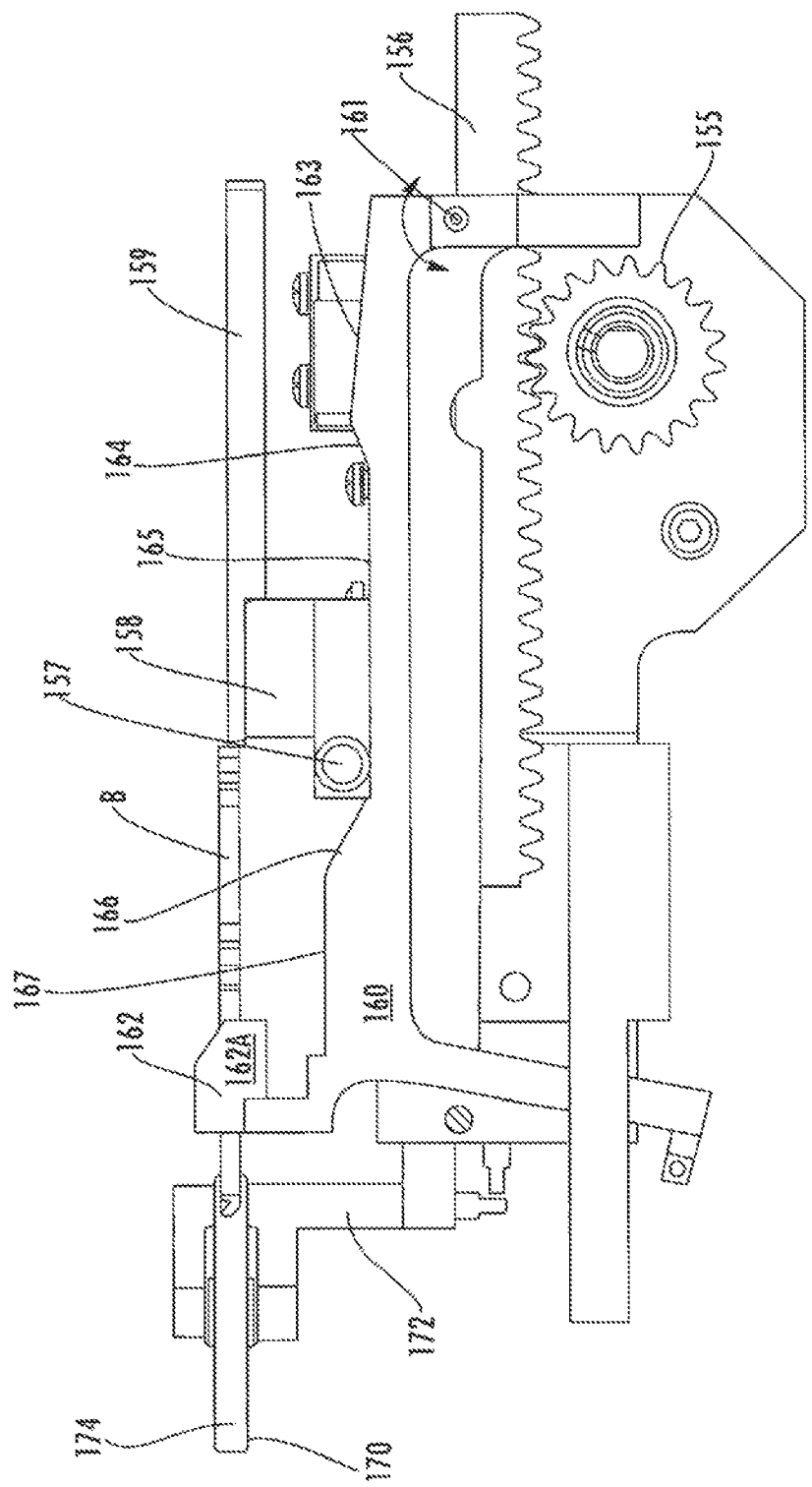

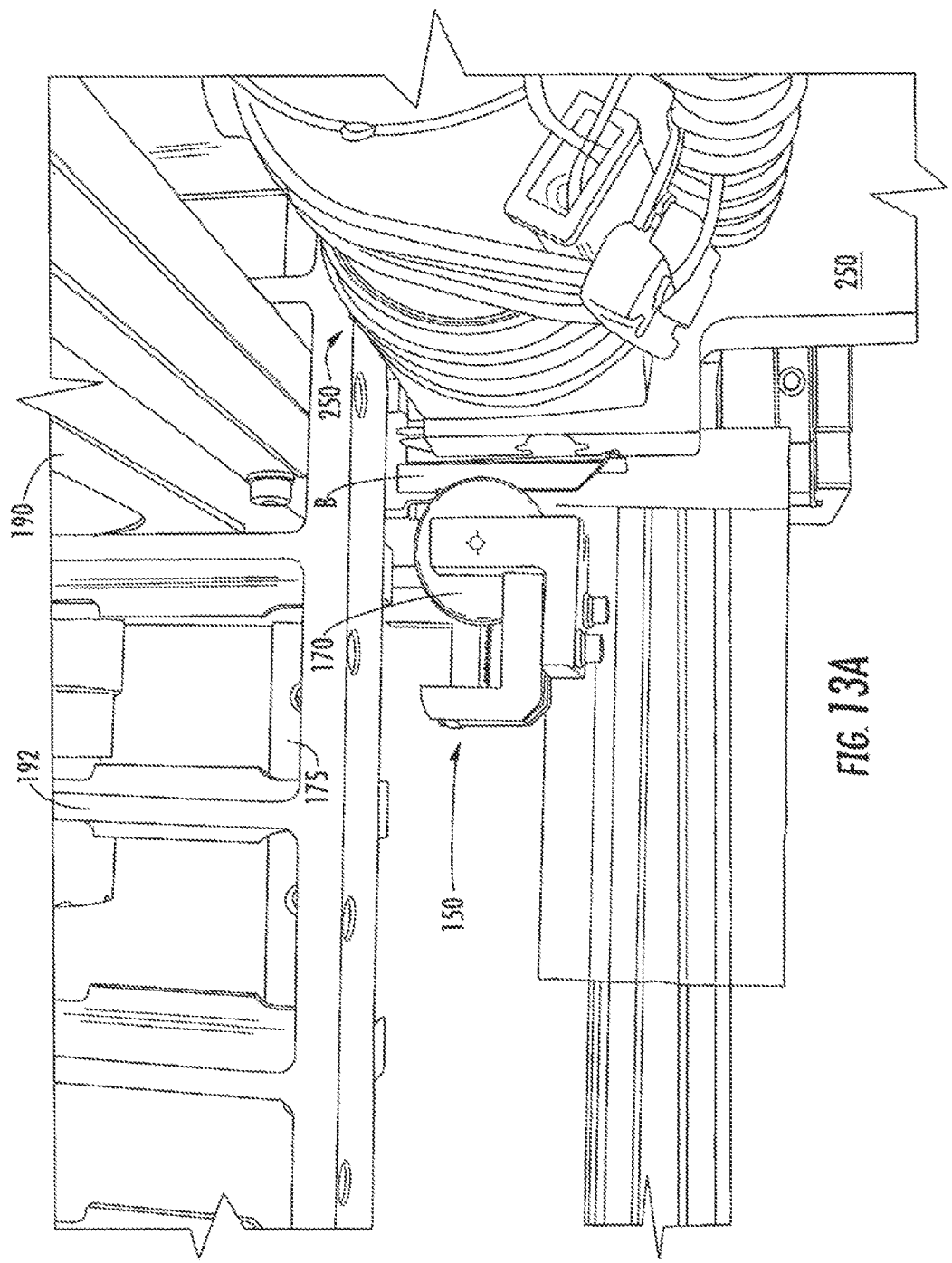

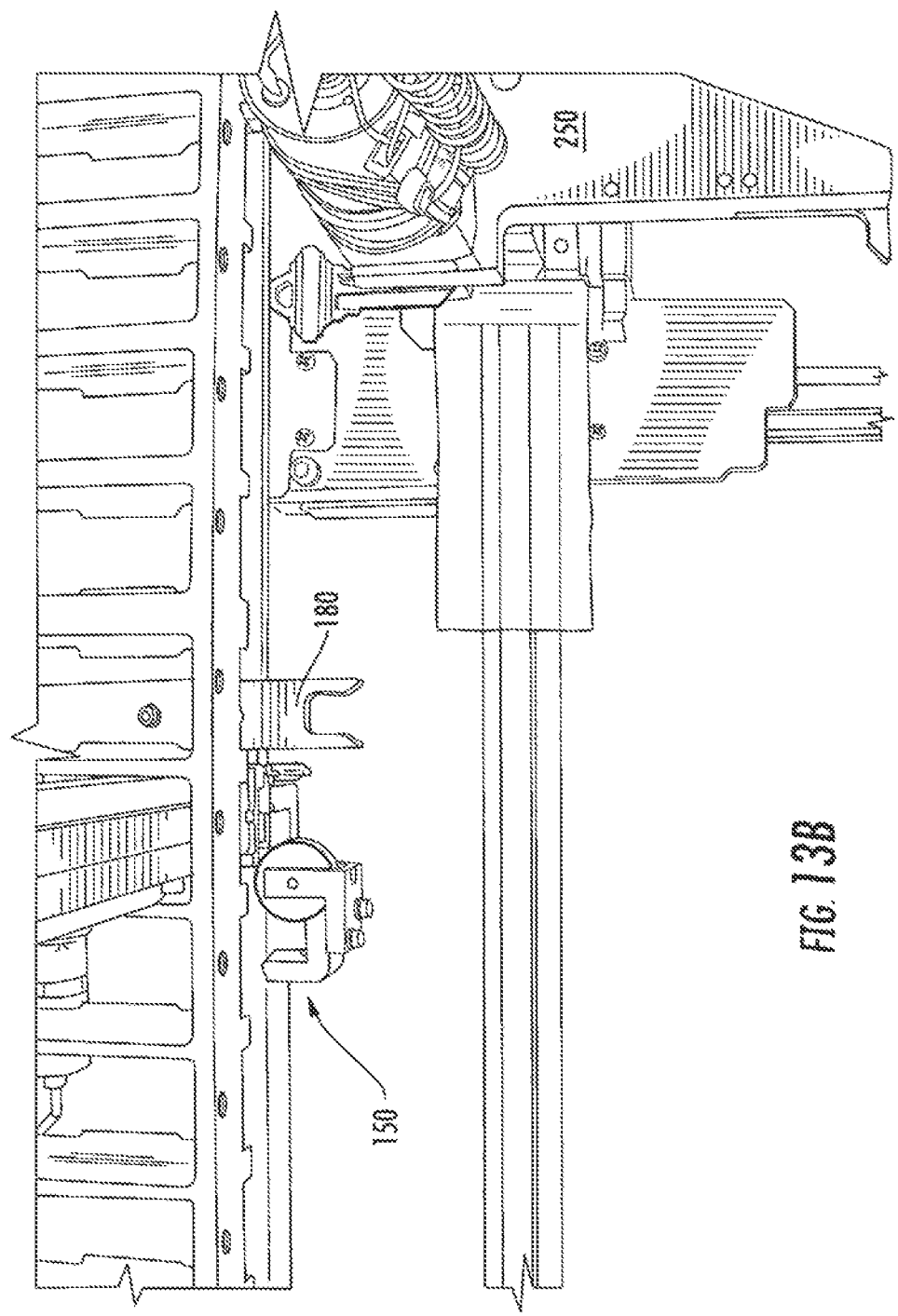

SELF SERVICE KEY DUPLICATING MACHINE WITH AUTOMATIC KEY MODEL IDENTIFICATION SYSTEM

CROSS-REFERENCE TO RELATED APPLICATIONS

This is a continuation of U.S. application Ser. No. 13/622,036, filed Sep. 18, 2012, which is a division of U.S. application Ser. No. 11/998,101, filed Nov. 28, 2007, now U.S. Pat. No. 8,287,215, which claims priority from U.S. Provisional Application No. 60/867,403, filed Nov. 28, 2006, and from U.S. Provisional Application No. 60/867,796, filed Nov. 30, 2006. All of the above applications are hereby incorporated herein by reference.

TECHNICAL FIELD

This is directed to the field of key duplication. More specifically, this is directed to the field of apparatuses and methods of automatic key duplication involving as little trained human operator input as possible.

BACKGROUND

Duplicate keys are typically cut from pre-existing master keys using a hand-operated table-top tool having two clamps, a cutting wheel, a follower and a cleaning wheel. A schematic of such a conventional key cutting tool appears in FIG. 1. In operation, a locksmith or someone of at least some training on the machine examines the master key A, tries to determine what type of key it is by eye/tool, tries then to determine which model of key it is by eye, and selects a corresponding key blank B from an array of scores of different models. The master key A is then clamped at the following station C, and the key blank B is clamped at the cutting station D. The two stations C and D are attached to a common base E, which is opposite the follower F and cutter G (which are both together mounted on base H).

Base H is then pressed down towards base E, or, conversely, base E is moved up towards base H, depending on the machine model, in the direction of arrow Y. This causes the cutter G to be brought into contact with the key blank B. The keys are moved longitudinally in the direction of arrow X with respect to the follower F and cutter G. Since the key blank B and the master key A are mechanically linked (i.e., they are clamped to the same base E), the follower F rides along the tooth pattern of the master key A, and the cutter G simultaneously cuts into the blank blade of the key blank B, removing blade material in the same configuration as the tooth pattern of the master key A. When the cutting is done, the operator removes both keys and places the newly cut key under a rotating cleaning wheel or brush (not shown) to remove burrs and any stray material left over from the cutting process.

This process is fraught with potential problems and mistakes. First, the operator may select the wrong type of key blank. Since each type of key (e.g., Kwikset, Schlage, Segal, etc.) has a differently shaped cross-sectional profile, using the wrong type will result a key that will not be able to enter the lock properly. Second, the operator may select the right type of key but the wrong model. Keys of the same type come in different lengths, for example, and the operator may select a blank having the wrong length. Moreover, there are many models of keys currently on the market. Many of the models are very similar in shape and cross-section. Even to the trained professional, model identification can be quite difficult and erroneous. This problem is only made worse by the tens of aftermarket manufacturers that produce keys with models that are designed to have the same dimensional features, but are actually manufactured with differences. Key model identification is necessary before duplication of a key. Third, the operator may not properly align the master key in clamp C, thereby causing the two keys to be out of register and he may not align the blank properly. Fourth, the operator may apply too little pressure or inconsistent pressure on base E and cause key B to be cut too shallowly or incompletely. Other problems may arise. In addition, since the device must be operated by someone trained on the device, duplicate keys may not always be readily available. Conventional key cutting machines are usually located in locksmith shops and hardware stores, or similar avenues of commerce not typically known to be open late into the evening. For these and other reasons, there is a long felt need to automate the process of key duplication so that ordinary consumers can obtain accurate duplicate keys by themselves, without requiring a specialty shop to be open for business, and without requiring a skilled tradesperson on hand to operate the machine.

Several attempts to automate the process of key duplication have been partly successful at best. There are several patents to so-called "automated" key identifying and/or duplicating devices, such as U.S. Pat. Nos. 4,899,391 and 5,127,532 to Cimino; U.S. Pat. No. 5,351,409 to Heredia; U.S. Pat. No. 3,956,968 to Crasnianski; and U.S. Pat. No. 5,538,374 to Cole et al. However, in each of these and others like them, one or more of the steps required to duplicate a key are still manual. For example, in some devices and methods, the operator must still determine what type of key the master key is and select a corresponding key blank. In other (and/or the same) devices, the master key is still aligned by hand and clamped by hand. Many of these prior devices still require a skilled tradesman to operate the machinery. In fact, even in the most automated key machine of today, the following steps are still performed by the operator: insertion of customer/master key, partial alignment of customer/master key, clamping of customer key, identification of customer key model, retrieval of key blank, insertion of key blank, partial alignment of key blank, clamping of key blank, starting machine, unclamping of customer key, removal of customer key, unclamping of key blank, removal of key blank, de-burring of key blank, returning customer key to customer, giving new key to customer and charging the customer a fee for the service.

Thus, there is still a long-felt need for a fully automatic key identifying and/or duplicating machine that can be operated by an ordinary consumer in a manner as easy as purchasing an item from a vending machine or receiving money from an automated teller machine.

SUMMARY

The invention fulfills the above and other long felt needs. In one embodiment, a master key clamping module receives and secures a master key having a tooth pattern to be duplicated and a master key alignment module is movably disposed into and out of proximity with the master key clamping module. The master key is aligned by the alignment module within the master key clamping module. A master key identification module is disposed in fixed relation to the master key clamping module and identifies a type of key secured in the master key clamping module. A key cutting module is provided including a key blank cutter. A central positioning base is automatically movable into and out of engagement with the master key alignment module and alternately automatically movable into and out of engagement with the key cutting module. The central positioning base is adapted to move the master key alignment module into proximity with the master key clamping module and adapted to secure a key blank to be cut at the key cutting module in accordance with the tooth pattern of a clamped master key.

Preferably, at least one magazine is provided for housing a plurality of key blanks; the central positioning base is movable into and out of proximity with the magazine and is adapted to cause removal one of the key blanks from the at least one magazine and move the removed key blank to the key cutting module. The central positioning base preferably includes a key blank securing groove and a key blank clamp on at least one side of the key blank securing groove adapted to secure a key blank inserted into the key blank securing groove. Preferably, a plurality of the magazines are provided, each of the magazines adapted to house a different model or color of the key blanks.

A key extraction module is provided engageable with the central positioning base substantially adjacent the key blank securing groove and slidingly disposed along the plurality of magazines and movable to a selectable one of the magazines by the central positioning base. The key extraction module preferably includes a reciprocatable push rod, disposable behind a lowermost key blank housed in one of the magazines, adapted to push the lowermost key blank out of the magazine. A guide roller is disposable adjacent the key blank being pushed out of the magazine by the push rod, substantially opposite the key blank securing groove of the central positioning base when the central positioning base engages the key extraction module. The guide roller preferably includes a circumferential guide groove receiving the key blank being pushed out of the magazine.

The extraction module preferably further includes an extraction base supporting the push rod and the guide roller and a cam rider projecting from and mechanically linked to the push rod. A key support arm is hingedly attached to the extraction base and cammingly connected to the push rod via the cam rider, the key support arm having a blade support platform at a distal end, the key support arm being spring-biased upward towards the push rod. When a key blank is being removed from one of the magazines, the key support arm is biased upward to cause contact between the blade support platform and the blade of the emerging key blank. The key support arm preferably further includes a proximal raised camming surface, a distal raised camming surface, and a central lowered camming surface. When the cam rider rides over either of the proximal or distal camming surfaces, the cam rider pushes the key support arm down away from the emerging key blank to prevent contact between the emerging key blank head and the blade support platform.

Each of the key blank magazines preferably further includes a pair of substantially parallel leaf springs disposed at one end of the magazine, the leaf springs being spaced apart to guide a lowermost key blank in the magazine out of the magazine during extraction, and generally to avoid the bottom keys from being knocked out/coming out by accident.

The master key alignment module preferably includes an alignment head, spring mounted on a reciprocating shaft, preferably in a distal position, the head being engageable with the master key as the master key is being inserted into the master key clamping module when the master key alignment module is in proximity to the master key clamping module. A locking switch is preferably provided engageable with the reciprocating shaft; when the locking switch engages the reciprocating shaft, the shaft is pushed with greater force and locked in the distal position. The locking switch preferably includes a rotating locking lever engageable with the reciprocating shaft by movement of the central positioning base against the locking lever in a direction substantially perpendicular to a sliding direction of the master key alignment module. The master key alignment module preferably further includes a master key shoulder detecting switch. When the master key is fully inserted into the master key clamping module, a shoulder of the inserted master key abuts against the master key shoulder detecting switch. The alignment head preferably includes a sloped leading surface and more preferably a groove adapted to accommodate and lead a master key as the master key is being inserted into the master key clamping module.

The master key clamping module preferably includes guideway projections that receive and guide a master key being inserted into the master key clamping module as well as an open section exposing teeth of the inserted master key.

The master key identification module includes a blade length sensing element spring-biasedly disposed within the master key clamping module and abuttable against a distal end of a master key inserted into the clamping module. At least one blade cross-section detector is also provided laterally engageable with the blade of the inserted master key, the cross-section detector having a profile corresponding to a cross-sectional profile of a given type of key. When the blade cross-section detector engages a key of the type corresponding to the profile, the profile substantially engages the blade and the master key is determined to be of the given key type. When a key type match is determined and the blade length sensing element determines the length of the inserted master key, the master key is determined to be a specific key model. The blade cross-section detector includes at least one pair of sliding elements disposed within the clamping module on opposite sides of the inserted master key, each of the sliding elements having a profile. When the sliding elements engage a key of the type corresponding to its profile, the sliding elements substantially close around the master key blade, and when the sliding elements engage a key not of the type corresponding to the profile, the sliding elements do not close around the master key blade or close too far around the master key blade.

A plurality of the pairs of the sliding elements are preferably provided. Each of the pairs of the sliding elements preferably have different respective profiles each corresponding to different types of keys.

The key cutting module preferably further includes a cut key cleaner, such as, for example, a rotating cleaning wheel; the key blank cutter may be, for example, a rotating cutting wheel. A first enclosure is provided substantially but not entirely surrounding the key blank cutter, the first enclosure having a first window exposing a portion of the key blank cutter for cutting. A second enclosure is provided substantially but not entirely surrounding the cut key cleaner, the second enclosure having a second window exposing a portion of the cut key cleaner for cleaning A vacuum source is in communication with the first and second enclosures that creates negative pressure substantially around the key blank cutter and the cut key cleaner to substantially remove debris created during cutting and cleaning of a key blank. Flexible flaps are preferably disposed on proximal and distal sides of the first and second windows (and more preferably, also on the top and bottom of the windows), engageable with the central positioning base when the central positioning base is securing a key blank at the key cutting module. The flaps on the distal sides of the windows are preferably longer than the flaps on the proximal sides of the windows. The key blank cutter preferably includes a cutting wheel rotatable in a first direction, and the cut key cleaner includes a cleaning wheel rotatable in a second direction opposite the first direction.

The central positioning base is preferably movable in an X direction by a first motor, preferably a gear box motor, and a Y direction by a second motor, preferably a direct drive motor. The central positioning base preferably includes a follower tracing the tooth pattern of the secured master key. When the central positioning base is securing the key blank at the key cutting module, the second motor is preferably provided with a variable amount of power depending on a substantially instantaneous height of the master key tooth pattern being traced. More preferably, when the follower rides along an uphill portion of the master key tooth pattern, the power provided to the second motor is reduced, and when the follower rides along a downhill portion of the master key tooth pattern, the power provided to the second motor is increased.

The master key alignment module is preferably slidingly disposed on a first rail in the Y direction, and the extraction module is preferably slidingly disposed on a second rail in the Y direction.

In another embodiment, the invention is an automatic key duplicating machine having a master key clamping module adapted to receive and secure a master key having a tooth pattern to be duplicated. A master key alignment module is movably disposed into and out of proximity with the master key clamping module, the master key being aligned by the alignment module within the master key clamping module. A key cutting module is provided including key blank cutter. A central positioning base is automatically movable into and out of engagement with the master key alignment module and alternately automatically movable into and out of engagement with the key cutting module. The central positioning base is adapted to move the master key alignment module into proximity with the master key clamping module and adapted to secure a blank key to be cut at the key cutting module in accordance with the tooth pattern of a clamped master key.

In another embodiment, the invention is an apparatus for automatically determining a type of a master key for duplication having a key clamp into which the master key is inserted and secured, the key clamp having a key receiving guideway, and at least one blade cross-section detector movably disposed within the key clamp in a direction substantially perpendicular to the key receiving guideway and laterally engageable with the blade of the inserted master key. The cross-section detector has a profile corresponding to a cross-sectional profile of a given type of key. When the blade cross-section detector engages a key of the type corresponding to the profile, the profile substantially engages the blade and the master key is determined to be of the given key type.

In another embodiment, the invention is an apparatus for automatically aligning a master key to be duplicated, having a key clamp into which the master key is inserted and secured, the key clamp having a key receiving guideway. An alignment base is provided movable into and out of proximity with the key receiving guideway. An alignment head is mounted on a reciprocating shaft substantially perpendicular to the key receiving guideway and spring-biased in a distal position away from the alignment base. The alignment head is engageable with the master key as the master key is being inserted into the master key clamping module when the master key alignment module is in proximity to the master key clamping module. A master key shoulder detecting switch is disposed on the alignment base. When the master key is fully inserted into the key clamp, a shoulder of the master key abuts against the master key shoulder detecting switch to indicate full insertion of the master key.

In another embodiment, the invention is a system for extracting a key blank from a pre-selected plurality of key blanks for cutting into a duplicate of a master key. At least one magazine houses a plurality of key blanks. A base is movable into and out of proximity with the magazine, the base having a key blank securing groove and a key blank clamp on at least one side of the key blank securing groove adapted to secure a key blank inserted into the key blank securing groove from the magazine. A key extraction module is provided engageable with the movable base substantially adjacent the key blank securing groove and movable to the magazine by the movable base. The key extraction module includes a reciprocatable push rod, disposable behind a lowermost key blank housed in one of the magazines, adapted to push the lowermost key blank out of the magazine.

The invention also includes a fully automated method of duplicating a master key. A master key inserted into a guideway in a clamping base is aligned by pressing down on outward-facing teeth side of the inserted master key. Complete insertion of the master key into the guideway is detected. A locking force is applied on the blade against the clamping base in a direction substantially perpendicular to the axis of the blade. The master key is clamped while the master key is subject to the locking force applying step. The type of master key that is clamped is identified by determining a plurality of physical parameters of the key. A key blank to be cut is secured in a movable base having a follower. The follower of the movable base is pressed against the master key tooth pattern while simultaneously pressing the secured blank against a key cutter such as a cutting wheel.

Preferably, a plurality of key blanks are provided in at least one magazine, more preferably a plurality of magazines each housing a different type, model, or color of key blank. The physical parameters determined in said identifying step enable automatic selection and extraction of a key blank from a specific magazine. Preferably, one key blank is extracted from the magazine by pushing on the lowermost key blank in the magazine and guiding the lowermost key blank into a key blank receiving groove. Preferably, the complete key insertion detecting step further includes the step of detecting the abutment of a shoulder of the master key against an alignment base.

Preferably, the master key identifying step further includes the steps of sensing a length of the inserted master key and detecting the cross-sectional profile of the blade of the inserted master key. The profile detecting step preferably further includes the step of attempting to close at least one pair of sliding elements around the blade of the inserted master key, the sliding elements being provided with the profile of a model/type of key. If the attempting step is successful and the sliding elements substantially close around the blade, the inserted master key is determined to be of the type having the profile of the sliding elements. A plurality of pairs of sliding elements are preferably provided, each pair being provided with a different profile corresponding to a different type of key.

Preferably, a vacuum source is provided substantially around the key blank cutter that removes substantially all debris created during cutting of a secured key blank. Additionally, a cut key cleaner is provided such as a rotating cleaning wheel, and the vacuum source is provided substantially around the cut key cleaner, and substantially all debris created during the cleaning of a secured cut key blank is removed. The key blank cutter is preferably rotated in a first direction while cutting the secured key blank, and the cut key cleaner is preferably in a second direction opposite the first while applying the secured cut key blank to the cut key cleaner.

The pressing step of the inventive method further includes the steps of varying the amount of power provided to a motor tasked with generating torque for the pressing step depending on a substantially instantaneous height of the master key tooth pattern in contact with the follower. More specifically, the power is reduced when the follower rides along an uphill portion of the master key tooth pattern, and the power is increased when the follower rides along a downhill portion of the master key tooth pattern.

In another embodiment, the invention is an automated method of duplicating a master key, including the steps of: aligning a master key inserted into a groove by pressing down on outward-facing side teeth of the inserted master key; detecting complete insertion of the master key into the groove; applying a locking force on the blade of the master key; clamping the master key thus aligned; extracting a key blank from a plurality of key blanks housed in at least one magazine; securing a key blank to be cut in a movable base having a follower; and pressing the follower of the movable base against the master key tooth pattern while simultaneously pressing the secured blank against a key blank cutter such as a cutting wheel.

In another embodiment, the invention is a method of duplicating a master key, including the steps of: aligning the master key within a clamp on a first base; clamping the master key thus aligned; securing a key blank to be cut in a second base having a follower, the key blank and the follower being fixed relative to each other; and engaging the follower of the second base with the master key tooth pattern while simultaneously engaging the secured blank with a key blank cutter.

In another embodiment, the invention is a fully automatic key duplicating machine, having a master key clamping module adapted to receive and secure a master key having a tooth pattern to be duplicated. A master key alignment module is provided movably disposed into and out of proximity with the master key clamping module, the master key being aligned by the alignment module within the master key clamping module. A master key identification module is disposed in fixed relation to the master key clamping module, and identifies a type of key secured in the master key clamping module. A key cutting module is provided and includes a key blank cutter such as a rotating cutting wheel. A central positioning base is automatically movable into and out of engagement with the key cutting module and secures a key blank to be cut at the key cutting module in accordance with the tooth pattern of a clamped master key.

BRIEF DESCRIPTION OF THE DRAWINGS

The invention will be better understood from the following description of preferred embodiments together with reference to the accompanying drawings, in which:

FIG. 5 is a top elevation view of a master key alignment module in accordance with the invention.

FIG. 6A is a side elevation view of a typical key.

FIGS. 6B-D are exemplary cross sectional views of different types of keys taken at the sectional line in FIG. 6A.

FIGS. 7A-D are front, side, and top elevation schematic views, respectively, of an automatic key identification system in accordance with the invention.

FIGS. 8A-B are front sectional schematic views of one pair of sliding elements opening and substantially closing around a key blade of the same corresponding type as that of the sliding elements in accordance with the invention.

FIG. 9 is a front sectional schematic view of the sliding elements of FIG. 8 failing to close around a key blade of a different type not corresponding to that of the sliding elements in accordance with the invention.

FIG. 10 is an exploded perspective view of a key identification module in accordance with the invention.

FIGS. 11A and B are perspective views of a key identification module in relation to a key clamping module in accordance with the invention.

FIGS. 12A-C are right, left, and top elevation views of a key extractor module in accordance with the invention.

FIG. 13A is a top perspective view of the key extractor module of FIG. 12 removing a key blank from a magazine and guiding it into a key blank securing groove in accordance with the invention.

FIG. 13B is a top perspective view of a key blank secured in the securing groove of the central position base on its way to be cut in accordance with the invention.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Description of the invention will now be given with reference to FIGS. 2-18. It should be understood that these figures are exemplary in nature and in no way serve to limit the scope of the invention, which is defined by the claims appearing hereinbelow.

Figure 1:
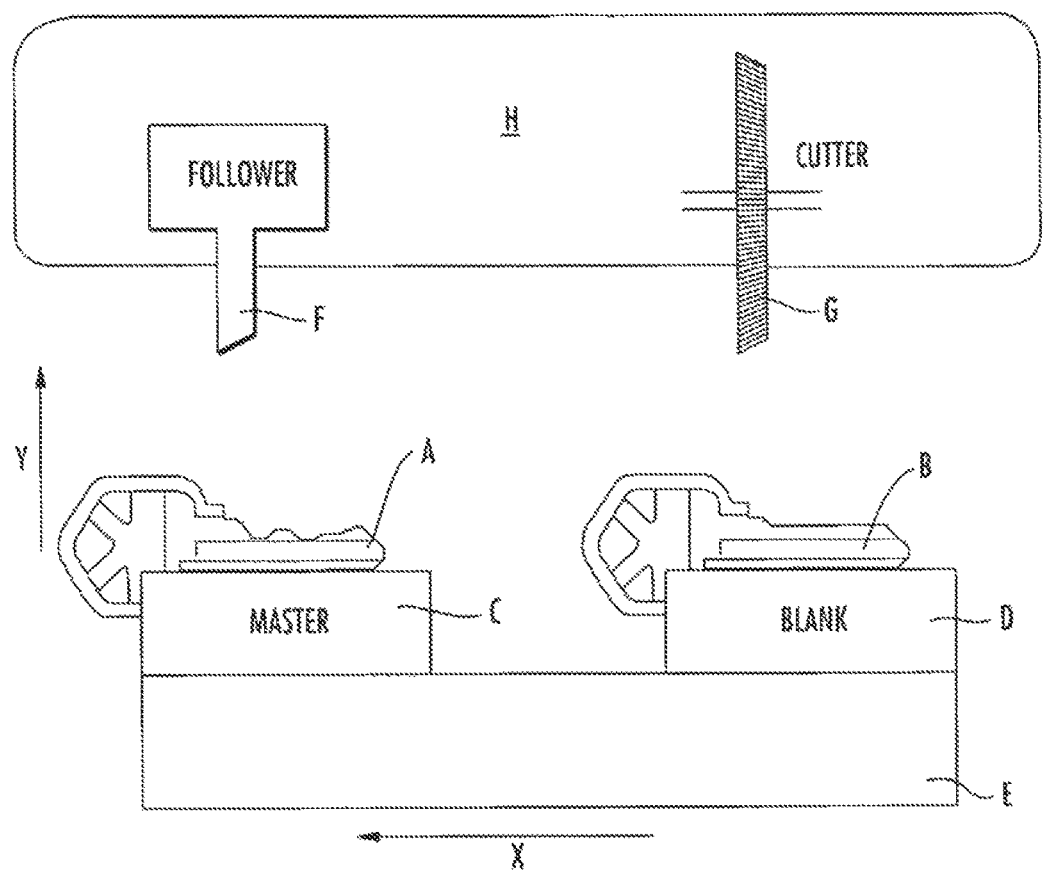
FIG. 1 is a schematic of a conventional manual key duplicating machine.

Key duplication requires the analysis of the master key to determine model and tooth pattern, and then the forming of corresponding teeth on a key blank. It is generally necessary to firmly hold the master key and key blank. As shown in FIG. 1 and described above, existing key duplication machines accomplish this task by fixing the master key and the key blank with respect to each other, such that they are oriented and aligned in a fixed and specific manner. Once secured, the existing machine performs one of the following duplicating procedures: (1) the keys remain fixed relative to each other and are moved in unison across a fixed tracer and a fixed cutter, or (2) the keys remain fixed relative to each other and fixed relative to the machine, and the tracer and cutter are moved in unison across the keys. In both cases, the keys remain fixed relative to each other, and the tracer and cutter remain fixed to each other.

It is generally found that the keys loading locations are relatively close to each other and are in the same general alignment. This is likely due to the fact that a human operator is required to load both keys into the machine, and it is more user-friendly and intuitive for the operator if the loading locations are close to one another and have the same alignment configurations.

Such a configuration proves difficult for automated processes. For a fully automatic process, the inventors have discovered that it is desirable to enable the consumer to insert a master key into a slot and have the key duplicated from the insertion point with the head of the key always projecting from the machine, in the same fashion as when the consumer opens a door. Consumers become nervous when their personal property such as a key is fully withdrawn into a machine, not to be seen for even a minute. Additionally, if a person inserts either a non-recognizable key or a foreign object into the insertion slot of the automatic device and it is fully withdrawn inside, a significant problem may arise in trying to eject the key/object, potentially causing damage to both the inserted key/object and the machine in itself.

Figure 2A:
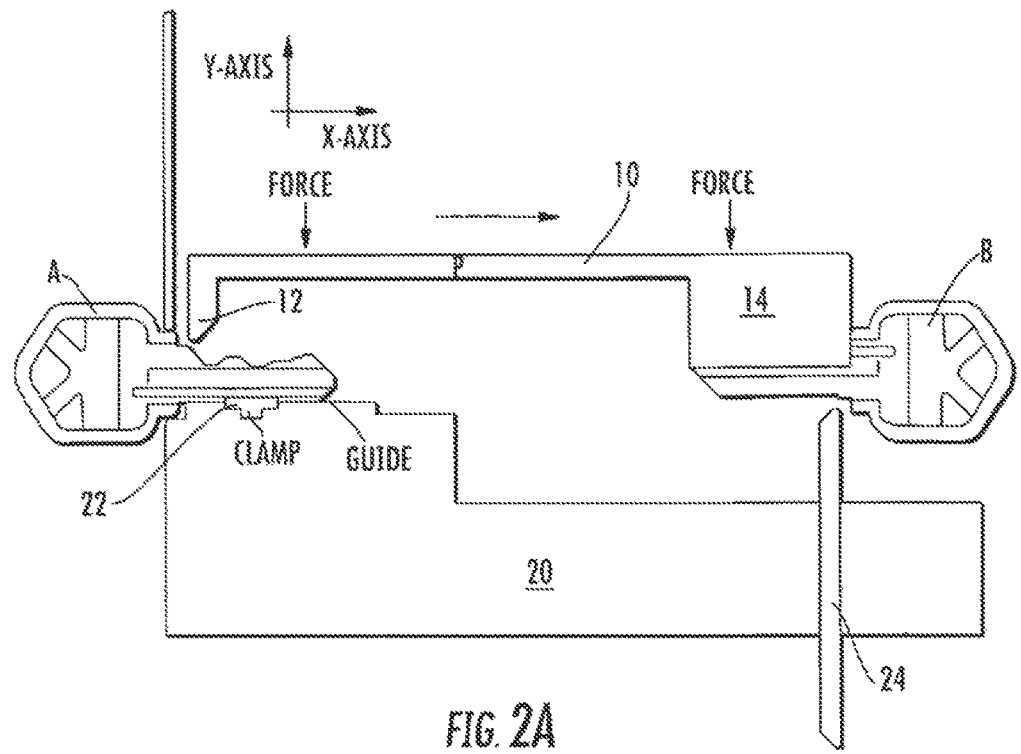
FIGS. 2A-B are schematics of a key duplicating machine in accordance with the invention.
Figure 2B:
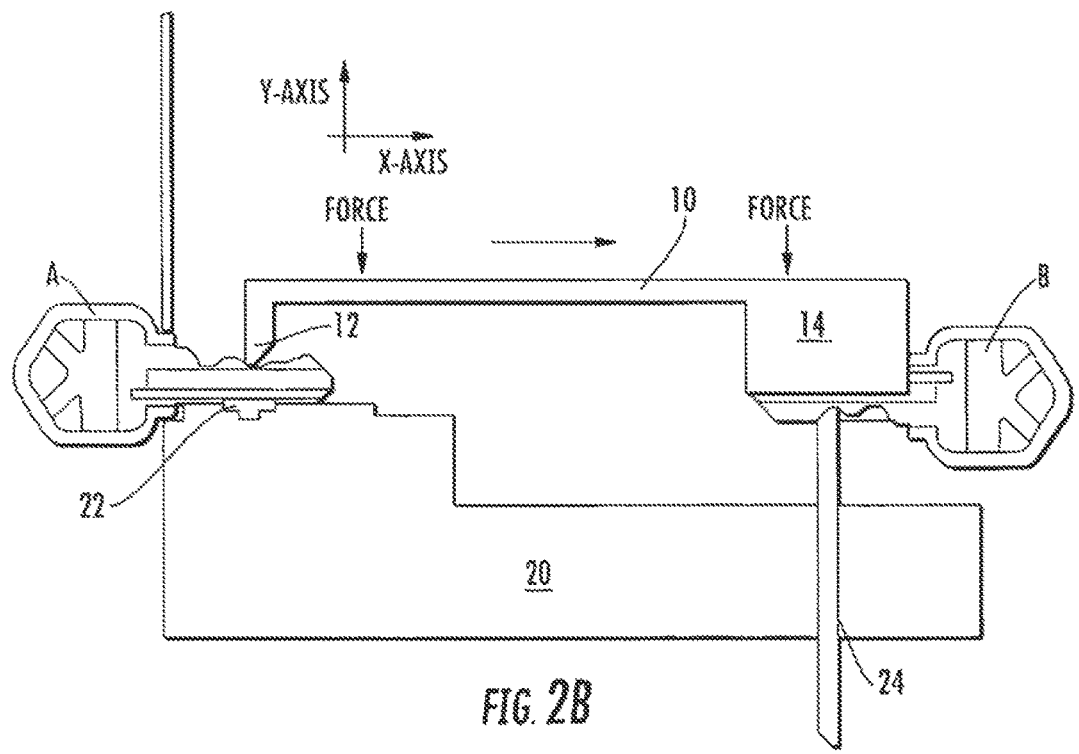

One solution to this issue is depicted generally in FIGS. 2A-B. Here, master key A and key blank B are not fixed relative to each other, as in conventional systems. Rather, two basic units 10 and 20 are provided. Unit 10 includes a tracer or follower 12 and key blank clamp 14. Opposite unit 10 is provided unit 20, which includes master key clamp 22 opposite follower 12 and cutter 24 opposite key blank clamp 14. Master key A and key cutter 24 of unit 20 are in a fixed position, while unit 10 is movable in the X-Y direction. This configuration, compared with conventional key duplication, requires a re-orientation of key blank B and of cutter 24. In this embodiment, key blank B faces master key A and is loaded from the opposite direction than master key A. Cutter 24 is oriented with the angled edge facing master key A. Unit 10 has means for moving in the X direction indicated by the lateral arrow. During duplication, force is applied in the negative Y direction as indicated by the downward vertical arrows. The tracer or follower 12 and key blank B translate across the original key A and cutter 24 to reproduce the master key's tooth pattern on key blank B FIG. 2B shows the system in mid-operation with a portion of the profile already formed into key blank B.

The invention is well suited for a fully automated key duplication machine, for at least the following reasons. First, it allows the master key to remain in a fixed position, thus preventing any intentional and unintentional movement by the human user which might cause misalignment either before the process starts or in mid-duplication. Second, it allows for a mechanically favorable situation in which the cutter and its components remain fixed. Also, it allows the key blank to be easily loaded from the 'back' side. This may be inconvenient for a human operator in a conventional setting, but it is well-suited for an automatic loading system which requires space to move and operate. Finally (but by no means exclusively), the orientation of the key blank is also well-suited for an automatic system loading from the back side. From the perspective of a rear-placed loading system, it allows for 'blade first' loading.

Figure 3A:
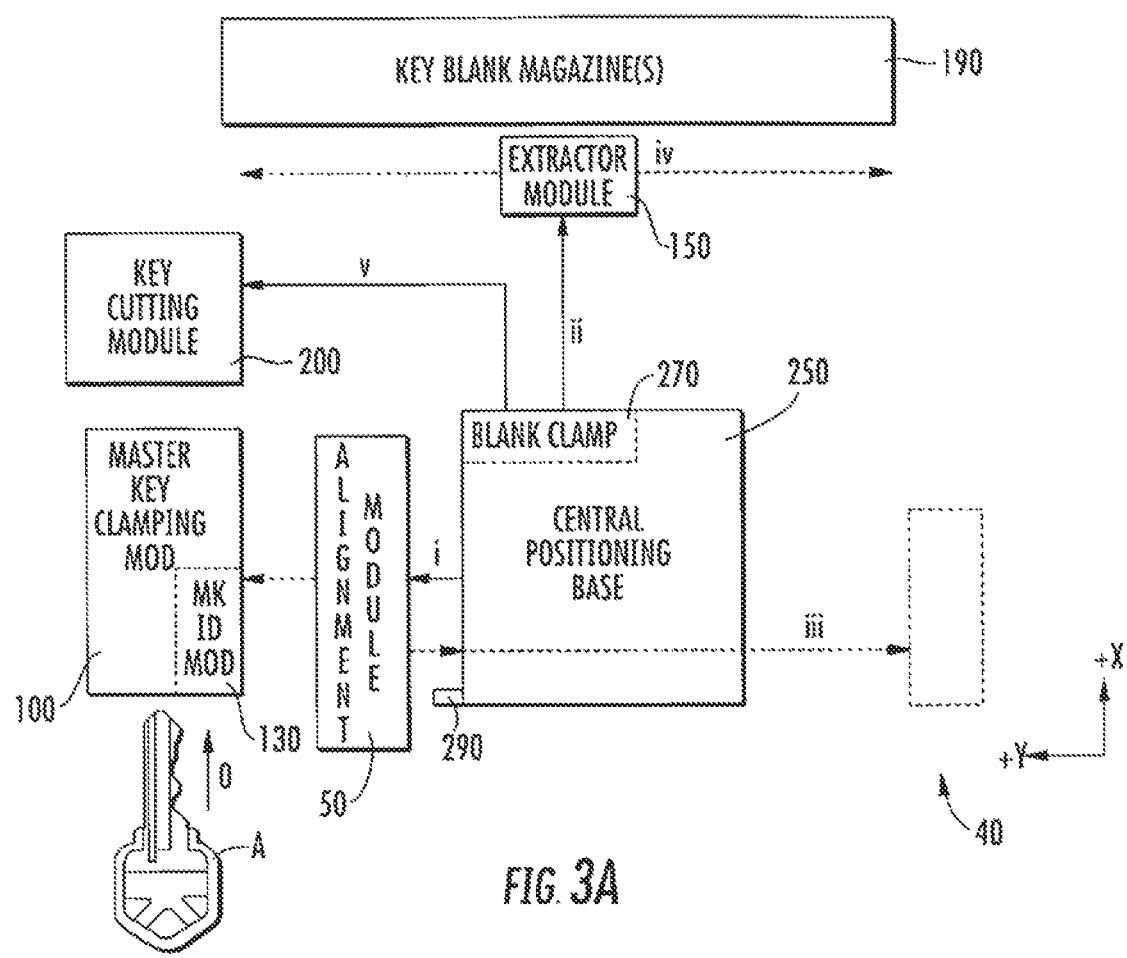
FIGS. 3A-B are schematic overviews of a fully automatic key duplicating machine in accordance with the invention.
Figure 3B:
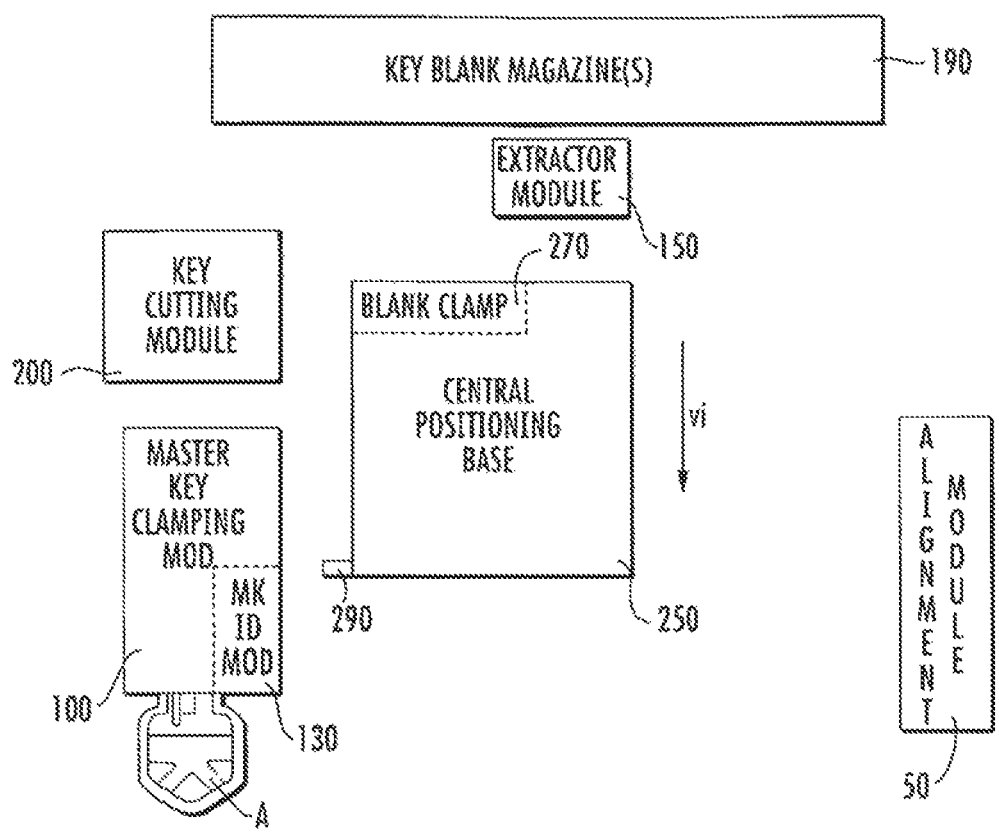

One such rear-placed blade-first blank loading system is described hereinbelow, first conceptually with respect to FIGS. 3A and 3B, then with more specific detail in the remaining FIGS. 4-18. FIG. 3 shows an overall schematic of a fully automatic key duplicating machine 40. The chief components are: master key alignment module 50; master key clamping module 100; master key identification module 130; key blank extractor module 150; key cutting module 200; and central positioning base 250. Central positioning base 250 is movable amongst several of the other modules and is capable of engaging two of the other modules for interaction with fixed components of the system. Base 250 is powered by any conventional mechanism of moving an object in one or two dimensions, such as a pair of encoded motors (one for the X direction, one for the Y direction) run by a computer, PLC, or a similar controlling device. The powered movement of base 250 is depicted by solid line arrows; when other movable but not self-locomotive components move as a result of engagement with base 250 (or via other means), such movement is depicted by dotted line arrows.

The initial step i of the inventive method is the moving of alignment module 50 into position near clamping module 100 so that a master key A inserted therein (at step 0) will be properly aligned. Alignment module 50 properly aligns the inserted master key (in a manner such as the exemplary alignment method to be described below), and when alignment is complete, clamping module 100 secures master key A by clamping it. Once the master key is aligned and secured, master key identification module 130 determines which type and model of key the master key is so that an appropriate key blank can be selected.

Next, central positioning base 250 disengages from alignment module 50 and moves to engage key blank extraction module 150 at step ii. Before base 250 disengages from alignment module 50, base 250 moves alignment module 50 out of the way of the secured master key inside clamping module 100 in step iii as shown in dotted lines. Alignment module is preferably spring-biased to remain out of the way after central positioning base 250 disengages therefrom. Extraction module is movable along one or more magazines 190 that house a plurality of key blanks Central positioning base 250 moves extraction module 150 to the appropriate magazine 190 in step iv, and extraction module 150 removes a key blank therefrom and guides it into key blank clamp 270 of base 250 for securement.

In step v, central positioning base 250 moves over to both key cutting module 200 and master key clamping module 100, which is possible because the alignment module 50 was moved out of the way (either by spring force or some other mechanism) in advance. The key blank disposed in blank clamp 270 is moved into engagement with the key cutting module 200 and is cut in accordance with the tooth pattern of master key A in clamping module 100. In the preferred embodiment, base 250 includes a follower 290 which traces or follows along the tooth pattern of the master key as base 250 is moved across key cutting module 200 and key clamping module 100 in step vi (see FIG. 3B).

Alignment module 50 is described in more detail in FIGS. 4-5. Module 50 includes a main base 52 on which reciprocating rod 54 is mounted. On the distal end of rod 54 is mounted alignment head 56; rod 54 (and thus head 56) are kept extended in a distal position (see FIGS. 4A-B, for example) by spring 58. Alignment head 56 preferably includes an angled or sloped leading surface 57 to accommodate insertion of a master key A into master key clamping module 100; as key A is inserted, the blade easily rides along sloped leading surface 57 and preferably in a groove in the underside of head 56 to move alongside alignment head 56 and to push head 56 upward slightly in the +Y direction. A master key shoulder detecting switch 60 is provided on alignment head 52 closest to the outer wall or housing 400 of the device 40 (see FIGS. 4A-B, for example). When a master key A is fully inserted (see FIG. 4D), the key shoulder abuts shoulder detecting switch 60 to indicate to the system that the key is fully inserted and the alignment process can begin.

As best shown in FIG. 5, alignment module 50 is preferably movable along rail 51 by operation of central positioning base 250. In the preferred embodiment, alignment module 50 includes an engagement hub receiver 55 which is adapted to receive an engagement hub 260 disposed on central positioning base 250. Base 250 is preferably used to move alignment module 50 out of the way of clamping module 100, and spring 53 is preferably provided to keep alignment module 50 out of the way of clamping module 100 when central positioning base 250 disengages its engagement hub 260 from engagement hub receiver 55 (e.g., if the machine 40 is jostled or bumped, it is possible for the alignment module to roll down its rail 51 if it were riot restrained by spring 53).

A locking switch or lever 62 is provided on alignment base 52 engageable with the proximal end of reciprocating rod 54 (see FIG. 5). Preferably, locking lever 62 is rotatably mounted on base 52. When engagement hub 260 of central positioning base 250 fully and firmly engages hub receiver 55, the edge of central positioning base 250 abuts against locking lever 62 to press it into locking engagement with shaft 54 to generate a "locking force" against rod 54 which keeps alignment head 56 fixed in its distal position. A strong spring 64 is preferably provided to transfer force and to prevent full surface-to-surface contact between central positioning base 250 and alignment module 50, which over time might result in damage to either component, owing to the central positioning base effectively bumping into alignment module 50 every time a key is made. Spring 64 provides a large compressive force to stiffen the position of alignment head 56 yet allows for some flexibility or play to accommodate variations in tooth height on master key A.

Figure 4A:
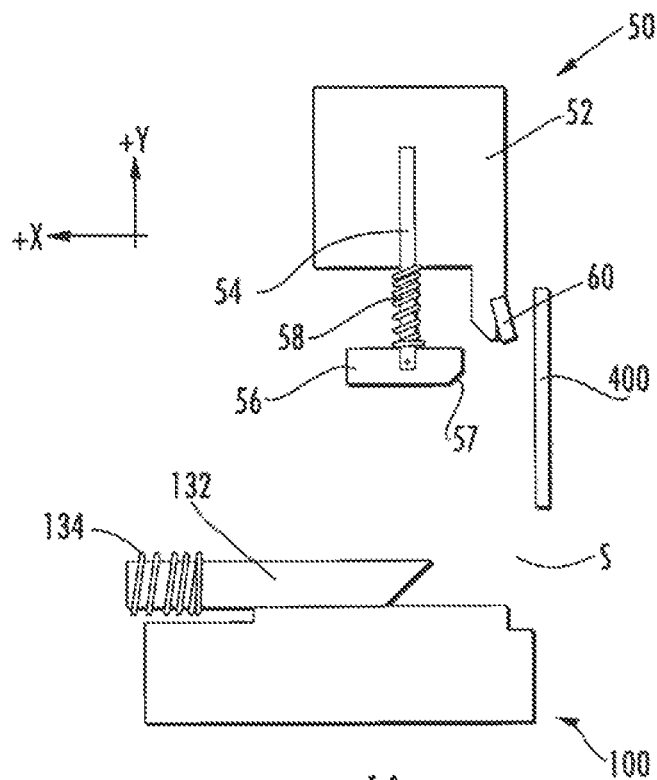
FIGS. 4A-G are schematics of an automatic master key alignment system in accordance with the invention.
Figure 4B:
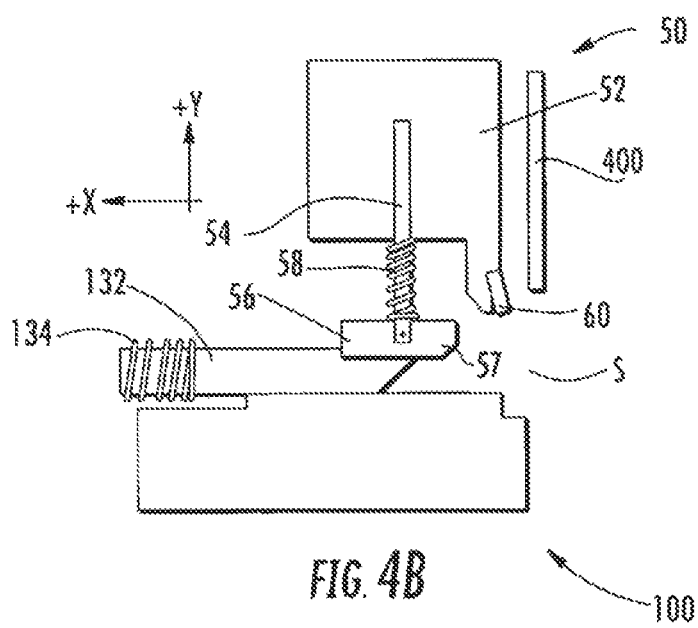
Figure 4C:
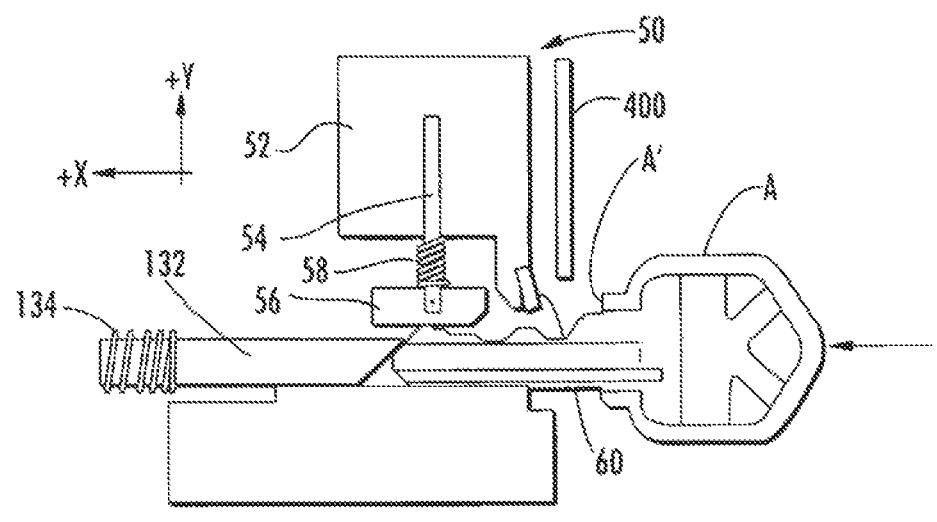

Operation of alignment module 50 is as follows. In FIG. 4A, alignment module 50 begins distant from clamping module 100, preferably by passive operation of spring 53. When the customer begins the ordering process, central positioning base 250 and its engagement hub 260 are already in engagement with hub receiver 55. Before the customer inserts a key, base 250 moves alignment module into position just opposite master key clamping module 100 as shown in FIG. 4B. The customer is then instructed to insert her key into slot S, and does so in FIG. 4C. Key insertion begins in the +X direction. Key length sensor 132 (part of master key identification module 130, to be described below) is pushed in the +X direction as key A is inserted against the biasing force of spring 134. Length sensor 132 measures the key length. Owing to the biasing force of spring 58, alignment head 56 guides the blade of the key, confines key movement, and loosely aligns the key blade by pushing it down in the −Y direction into the clamp (to be described below).

Figure 4D:
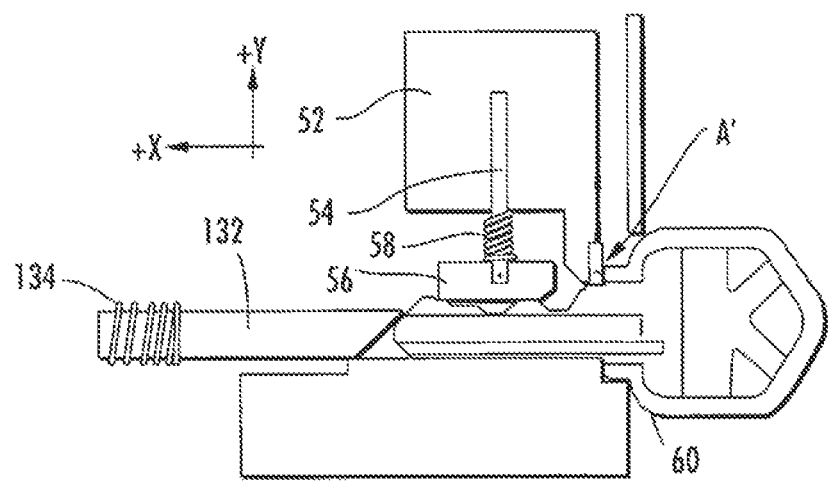
Figure 4E:
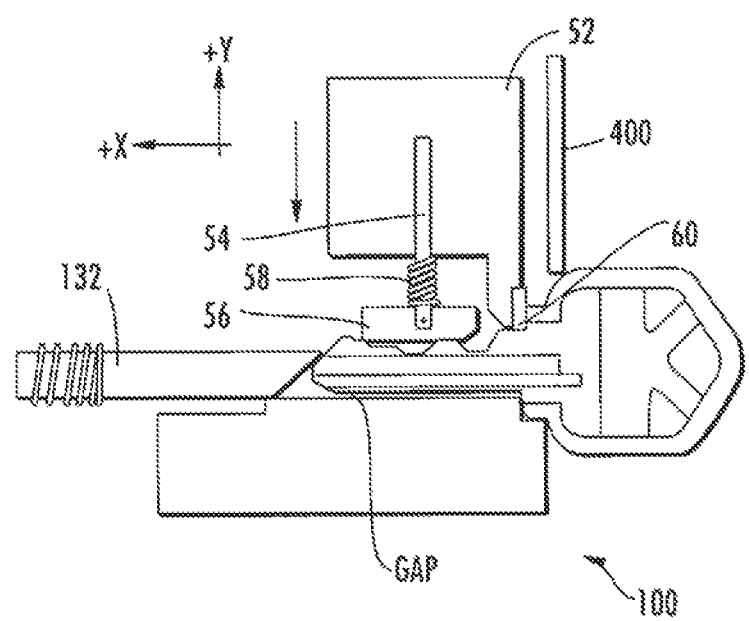
Figure 4F:
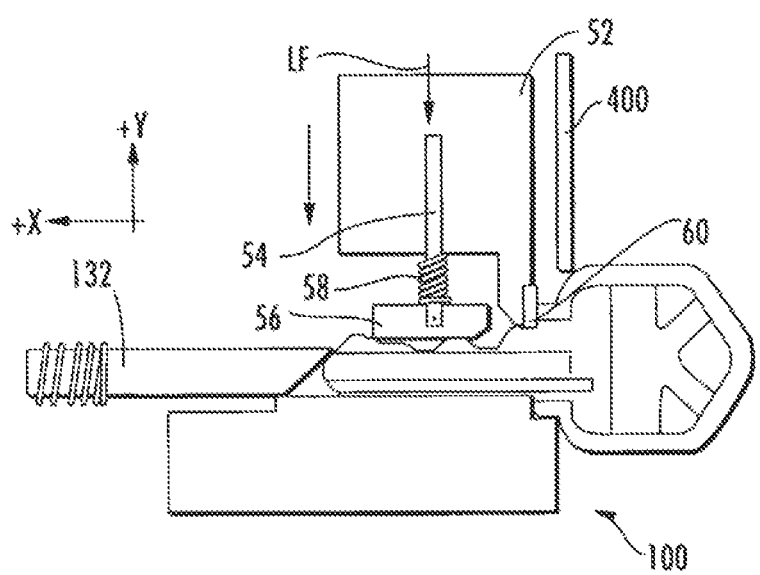

Master key A is shown fully inserted in FIG. 4D, and key shoulder A1 engages shoulder switch 60. When switch 60 is engaged, and if length sensor 132 determines master key A to be of an acceptable length, central positioning base 250 moves alignment module 50 down in the −Y direction as shown in FIG. 4E. This causes force to be applied just in front of the shoulder A1 and under alignment head 56. The alignment head 56 still has some play, owing to the resilience of spring 58. Next, central positioning base 250 moves slightly in the −X direction to cause base 250 to engage spring 64 and produce force on locking lever 62, thereby transferring force to rod 54 (and thus alignment head 56) causing extra force to be applied to key A (see FIG. 4F). This locking force provides final alignment to the master key.

Figure 4G:
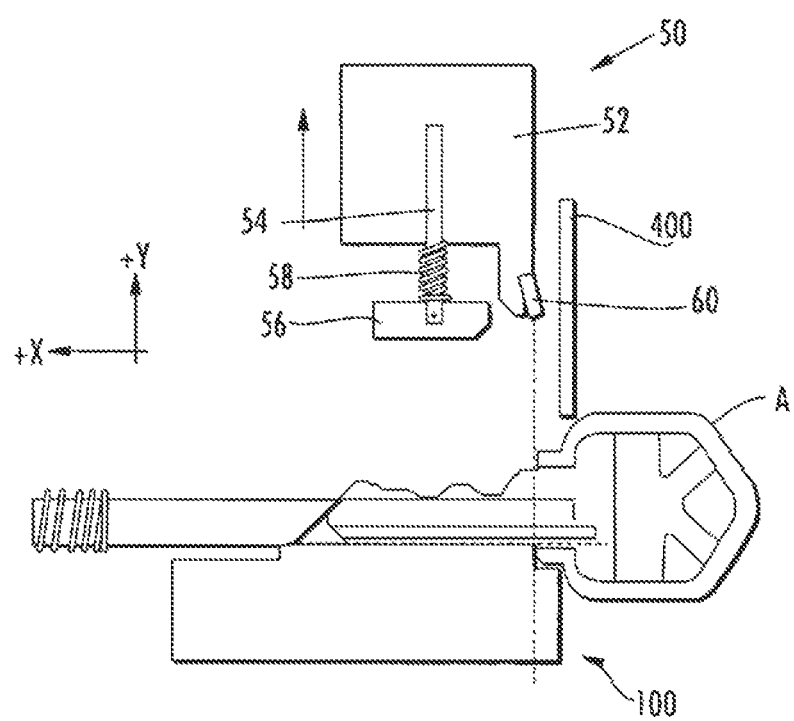

At this point, after a complete alignment sequence, the key is clamped into position, and central positioning base 250 returns module 50 to its "out" location and disengages from alignment module 50. Spring 53 maintains module 50 away from clamping module 100 in the +Y direction, as shown in FIG. 4G.

Figure 4H:
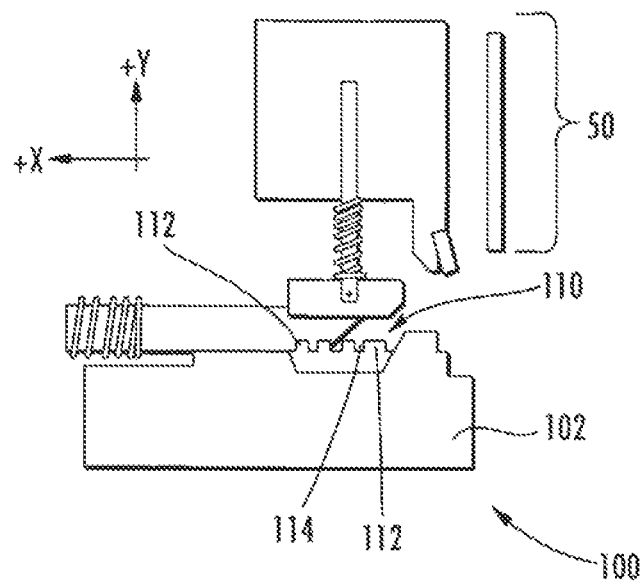
FIGS. 4H-I are schematics of the key alignment system of FIGS. 4A-G including a master key clamping module in accordance with the invention.

Master key clamping module 100 is best shown in FIGS. 4H and I. Module 100 includes a clamping base 102 having proximal and distal clamping jaws 104A, B. To ensure that the master key A does not become misaligned as it is being inserted while the tip of its blade passes between proximal clamping jaws 104A and distal clamping jaws 104B, guideway piece 110 is mounted therebetween. Guideway piece 110 preferably includes projections 112 and a central guideway 114 that receives the inserted key A. In between adjacent projections are provided identification slot 116, for reasons which will become clear below. Guideway piece 110 is preferably mounted to only one of the two portions of clamping base 102.

Once the alignment module is finished aligning the key as described above, the two portions of clamping base 102 move together to lock the key in place. It is not necessary for both portions of base 102 to move to clamp key A; one portion may be fixed, and the other portion may move to meet it.

Master key identification module 130 is depicted best in FIGS. 6-11. One portion of identification module 130 has already been described: key length sensor 132 shown in FIG. 4. When master key A is fully inserted (as detected by shoulder switch 60), the length of the key is determined by spring-biased length sensor 132. That is one piece of information, but it does not determine what type of key has been inserted. As shown in FIG. 6 the blade of master key A (FIG. 6A) can have one of several different cross-sectional profiles, as shown in FIGS. 6B-D; FIG. 6B depicts a first cross sectional profile A', FIG. 6C depicts a second cross-sectional profile A", and FIG. 6D depicts a third cross-sectional profile A'". Determining which profile a key has effectively determines what type of key it is.

Figure 4I:
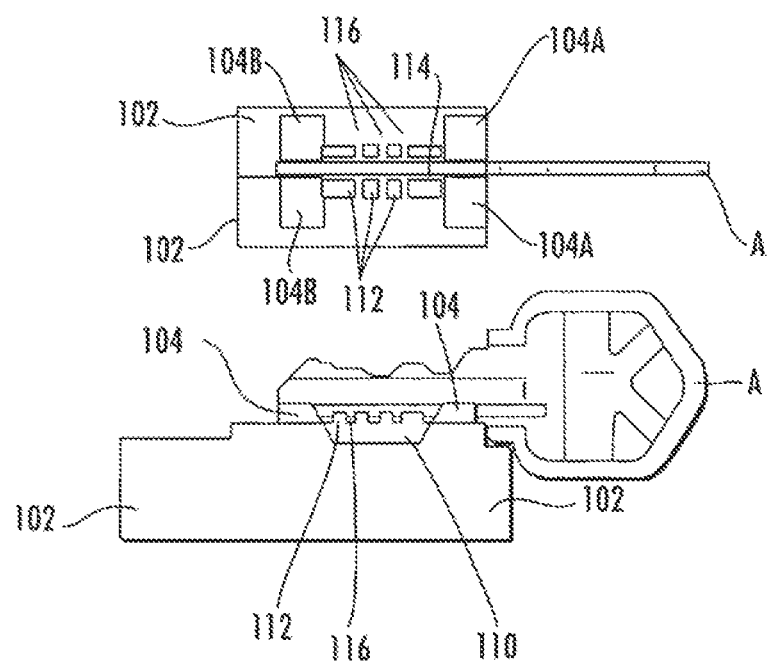

FIG. 7 shows the other portion of master key identification module 130: sliding elements 140 that can slide to and away from the key (FIG. 7) through identification slots 116 provided in guideway piece 110 (see FIGS. 4H-I). As depicted in FIG. 7, four pairs of slides 140-A-D are provided. Each slide 140 has a profile 142 that corresponds or is similar to the cross-sectional profile A'-A'" of one side of a specific model of a key. Each identifiable model of key would have a pair of slides 140 each with a corresponding profile for that side of the key, so that when the slides are closed completely together, they form a hole in the shape of a keyhole for that particular type. Several pairs of slides 140 may be provided in each system as to be able to identify several types of key. Means are provided for identifying when each slide is in an open position, fully closed position, or past closed position; such means may include an optical switch or electronic contact switch. The slides are provided with means for moving back and forth, such as a spring, motor or solenoid. The preferable default position of the system leaves the slides in the open position.

FIG. 10 shows a more detailed embodiment of the alignment system of the invention. For clarity and simplicity, only the left-side elements are shown. Sliding elements 140A-C are respectively provided with profiles 142A-C, which correspond to different types of keys. For example, profile 142A may correspond to a Schlage key, profile 142B may correspond to a Kwikset key, and profile 142C may correspond to a Weiser key. Other key types may be identified with other corresponding profiles. Sliding elements are provided with spring bias by springs 144A-C, and are slidable into and out of housing 146. Proximal ends of sliding elements are provided with optical sensor flags 148A-C. Positions of sensor flags are read by optical recognition printed circuit board 147 through the window in isolation foil 145.

The operation of the slide elements is shown best in FIGS. 8, 9, and 11. Each slide element 140 is initially positioned away from key A and is moved to close around the master key A. As shown in FIG. 9, if the profile of the key does not correspond to the profile of sliding elements 140, and thus if contact is made between a sliding element 140 and the key before the slide reaches its fully closed position, then the optical switch will not be triggered for that slide. When a pair of slides has at least one un-triggered switch then it may be concluded that the sample key is not of the same type as the slider pair's profile. If premature contact is not made with the master key and the slide elements 140 closes substantially around the blade of the key, then the optical switch will be triggered for that slide. If both switches of a slider pair are triggered, then it can be concluded that the sample key cross-section is capable of fitting within that slide-pairs outlined hole (see FIG. 8B).

FIG. 11A depicts a master key A clamped in clamping module 100 with sliding elements 140A-C in an open position. FIG. 11B depicts the same clamped master key A with sliding elements 140A-C closing around the key.

The slides are preferably made of a thin and strong material such as hardened steel. Such a thin material will allow several rows of sliders to be placed in one system.

There are cases in which a certain number of slide-pairs may be capable of identifying more key models than there are slide-pairs. For example, after studying the combinations of models in a particular system, it may be concluded that a particular slide profile may substitute for multiple other slides. Further, in some cases, it may be possible to use different combinations of ON-OFF switches of different slides to determine models. Such configurations would reduce the amount of slides in a system.

It is also important to note that a slide-pair may be designed in a way where they do not contact each other when in a closed position. The switches may be placed to determine position rather than determining a closed or not-closed situation.

In an alternate embodiment, pins may be placed in strategic locations instead of slides to determine key types.

Figure 12A:
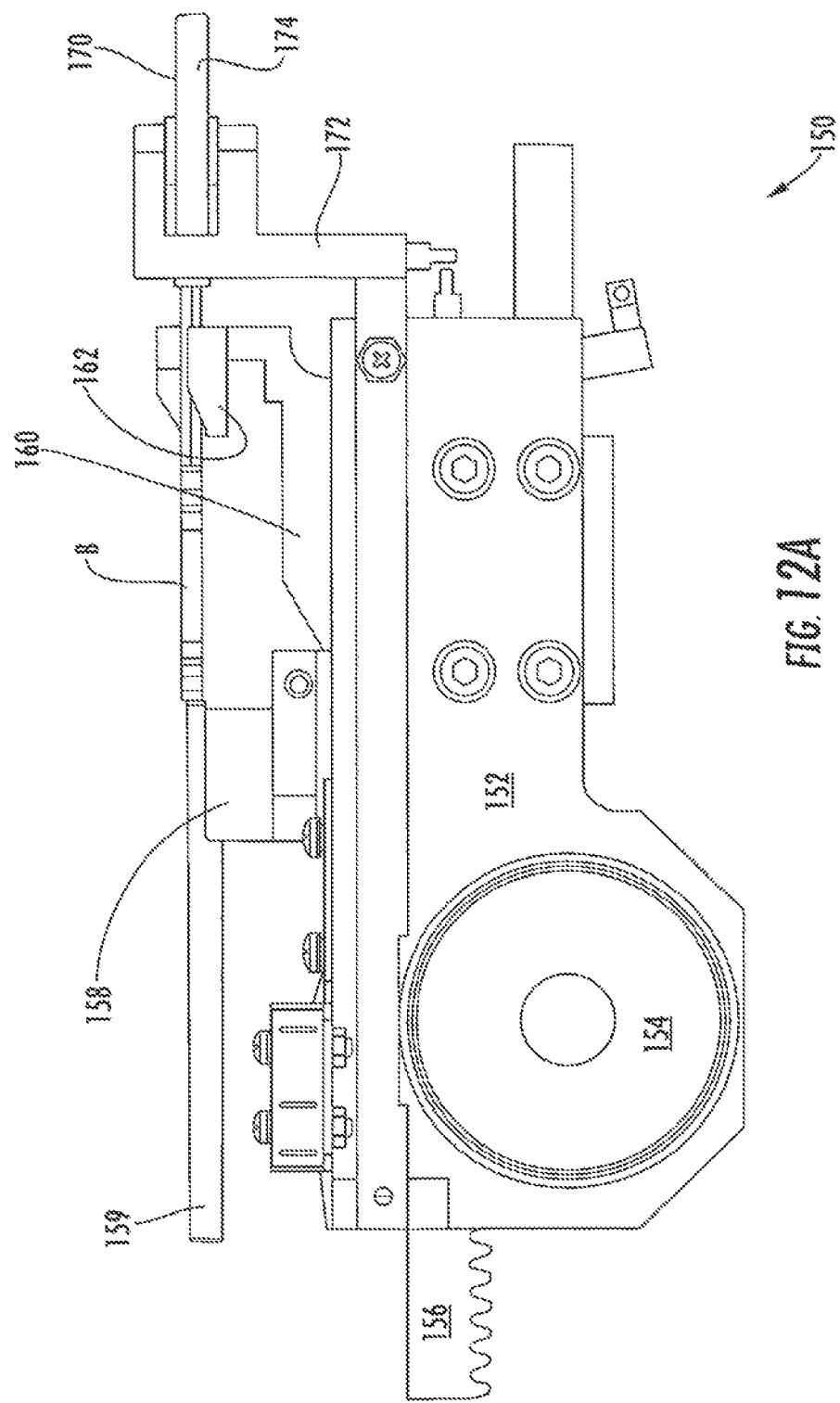
Figure 12C:
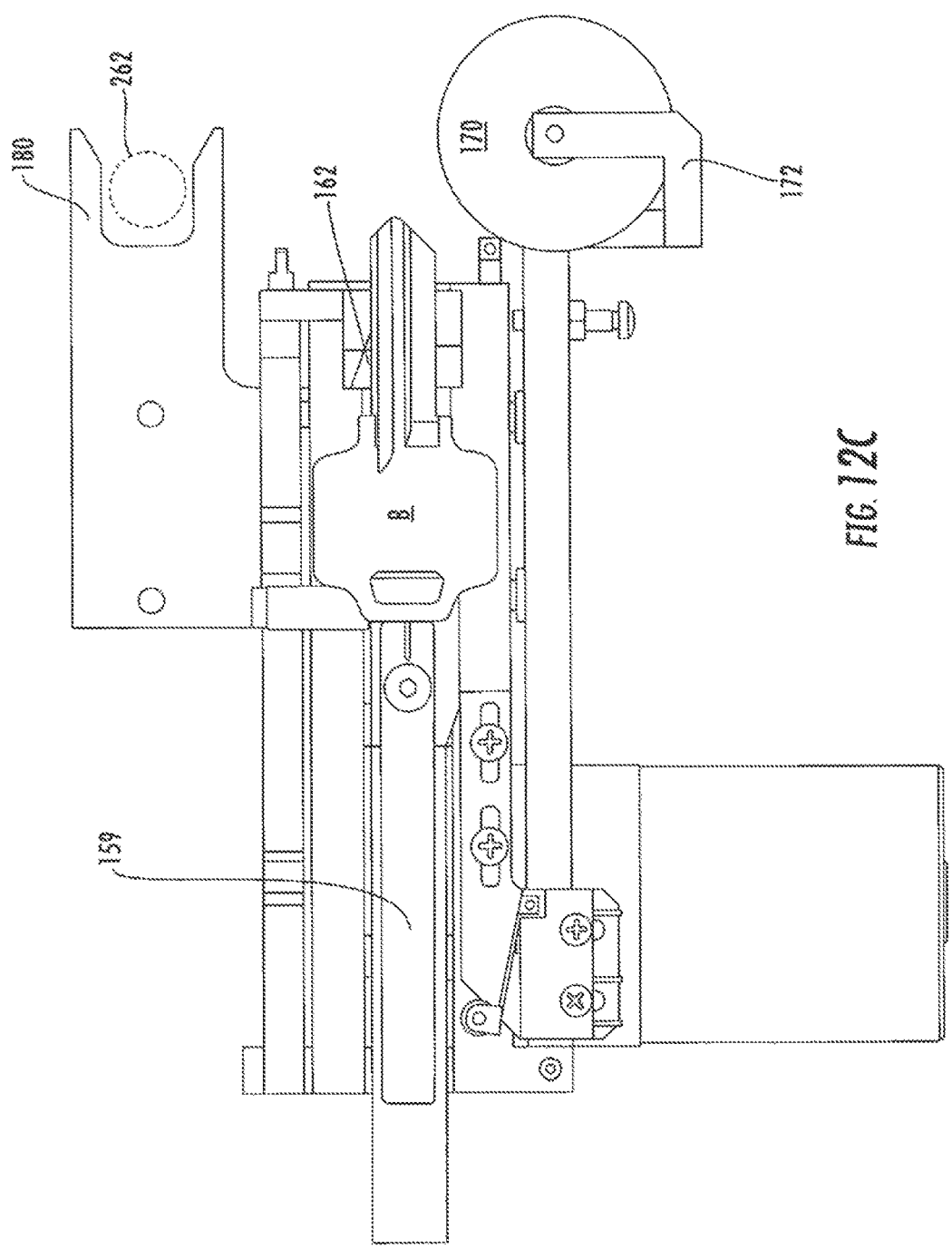

FIGS. 12 and 13 illustrate details of the key blank extraction module 150. Module 150 includes an extraction base 152 on which is mounted motor 154 (FIG. 12A). Motor 154 includes gear 155 which meshingly engages rack gear 156 (FIG. 12B). Slider 158 is mechanically linked or attached to gear rack 156, and push rod 159 is attached or mechanically linked to slider 158. Operation of motor 154 therefore causes push rod 159 to move. Extraction module 150 is disposed below and behind the lowermost key blank housed in a magazine 190 so that when motor 154 causes push rod 159 to move, push rod 159 pushes the key blank B out of magazine 190 and into key blank clamp 270 of central positioning base 250 (see FIGS. 13-A-B). A guide roller 170 is attached to base 152 via bracket 172; when a key blank is extracted from a magazine, the blade of the blank rides along guide roller 170. Guide roller 170 is preferably provided with a circumferential channel or groove 174 for ensuring proper guidance and alignment of the blank.

Proper alignment of the key blank is critical while the key blank is being extracted from the magazine and placed into blank clamp 270. However, because keys have relatively narrow blades which terminate in a wider head, guiding and supporting the key while it is being extracted is made more complicated. In one embodiment, a key support arm 160 having a blade support platform 162 is provided attached to the extractor base 152. In the preferred embodiment, blade support platform 162 includes vertical guide walls 162A designed to keep the blade of the key from experiencing roll, pitch, or yaw. However, the blade support platform 162 must be moved out of the way when the key head is ready to pass therethrough, since the key head is wider than the space between guide walls 162A.

FIG. 12B best shows one embodiment of the mechanism for moving the key support arm 160 and blade support platform 162 out of the way of the oncoming key head. Key support arm 160 is pivotably attached to base 152 at pin 161; arm 160 is biased upward by a spring (not shown). Slider 158 is provided with a cam rider 157 which rides along the upper surface of key support arm 160. The upper surface of key support arm 160 includes a proximal raised camming surface 163, a central lowered camming surface 165, and a distal raised camming surface 167. Ramped portions 164 and 166 are provided on either side of the lowered central camming surface 165 to smooth the transition between sections. When cam rider 157 rides over either of the proximal or distal raised camming surfaces 163 and 167, the cam rider 157 pushes the key support arm 160 down away from the emerging key blank to prevent contact between the emerging key blank B and the blade support platform 162. Only one motor 154 is required to extract the key blank and move the key support arm 160 into and out of engagement with the key blank.

Extraction module 150 includes an engagement hub receiver 180 (FIG. 12C, FIG. 13B) for receiving engagement hub 262 on central positioning base 250. Engagement module 150 is slidable along rail 175 (see FIG. 13A) as it is moved by central positioning base 250. Rail 175 preferably runs underneath magazines 190 disposed in magazine rack 192. Once the central positioning base 250 has received and clamped a key blank, it disengages from extraction module 150 as shown in FIG. 13B and moves over to key cutting module 200.

Figure 18:
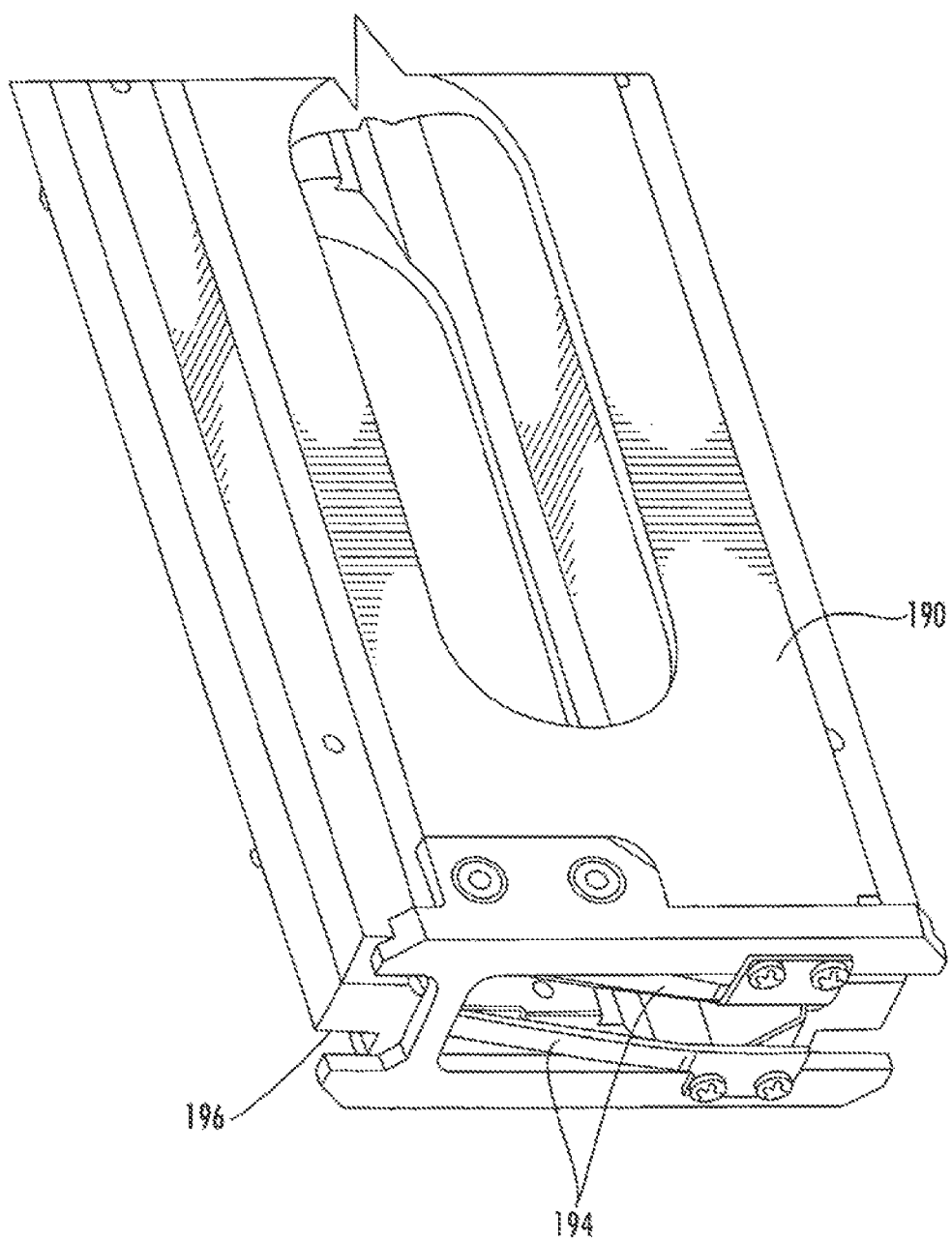
FIG. 18 is a lower perspective view of a key blank magazine in accordance with the invention.

As shown in FIG. 18, the bottom of magazine 190 preferably includes a pair of leaf springs 194, which serve several functions. First, leaf springs 194 help prevent the lowermost key blank from sliding out of slot 196 without the aid of extraction module 150. Second, the pair of leaf springs 194 are spaced apart so as to serve as a guideway for the blade of the key. As the key blank is pushed out, leaf springs 194 keep the blade straight, until the head of the blank key passes over the springs at which point the leaf springs are simply pushed downward by the head of the key. Once the key is fully removed from the magazine, leaf springs 194 snap back into place to secure the next key.

Figure 14:
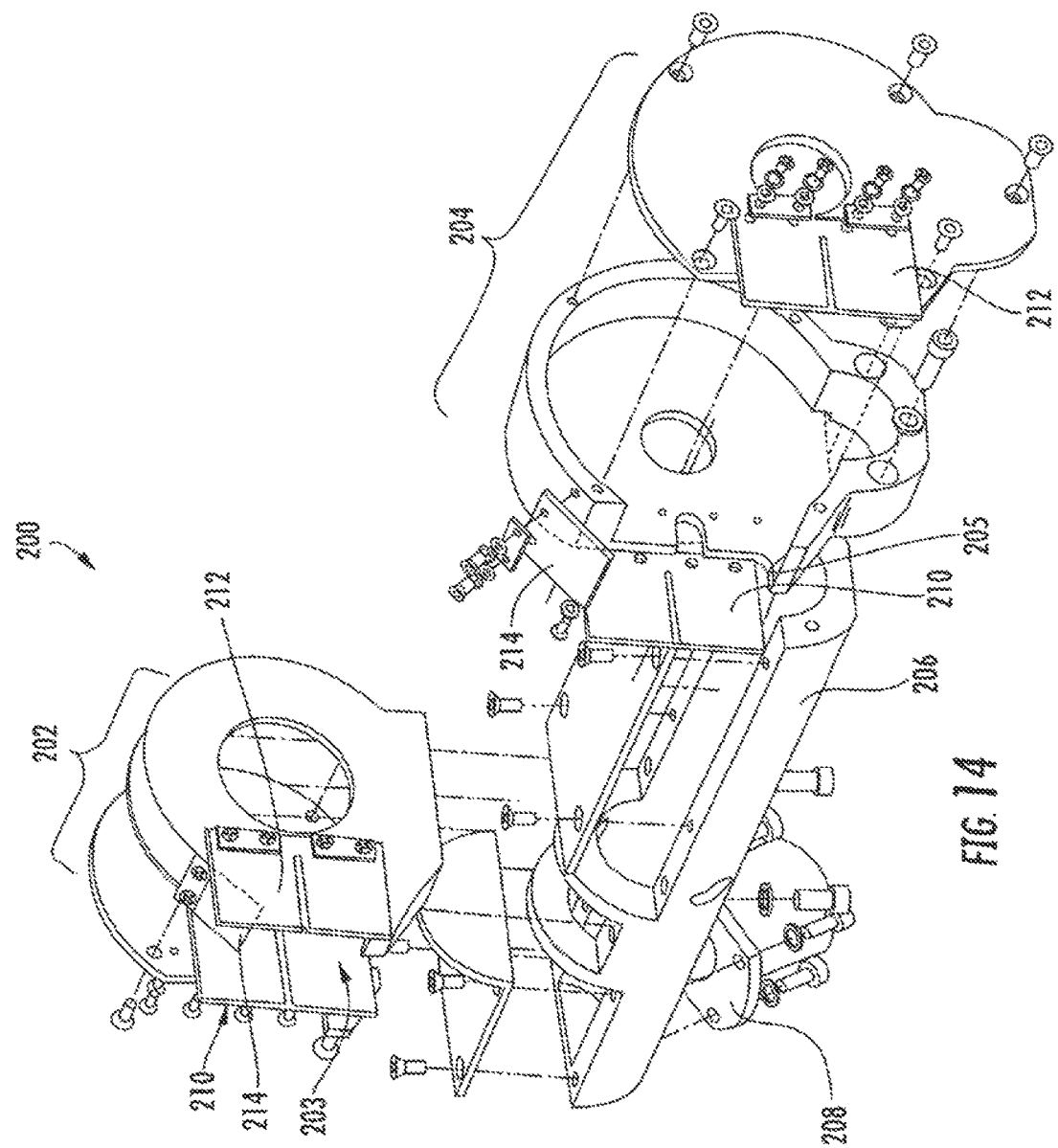
FIG. 14 is an exploded perspective view of the key cutting module with the cutting wheel and brush removed for clarity.
Figure 17A:
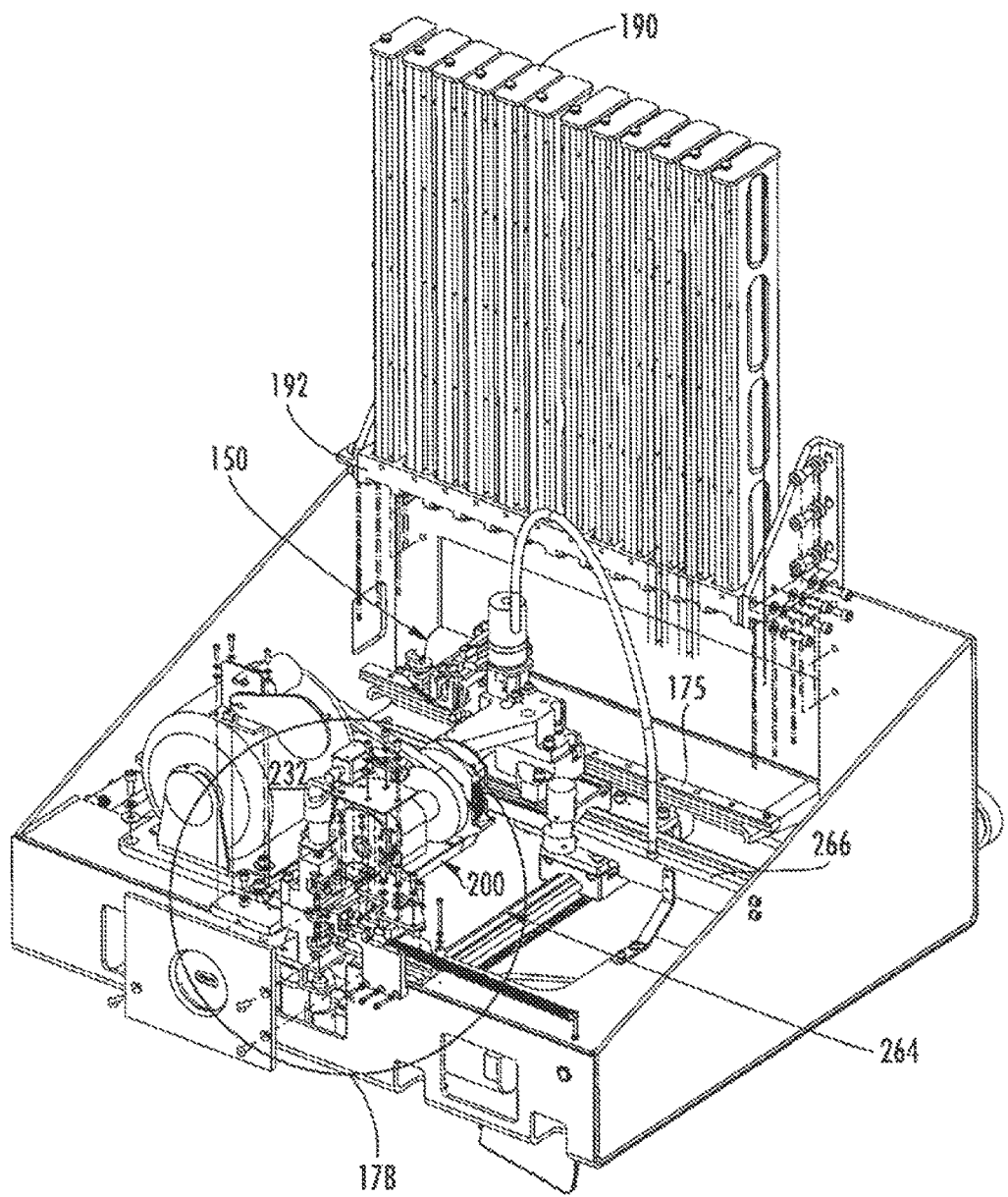
FIG. 17A is an exploded perspective view of a fully automatic key duplicating machine in accordance with the invention.
Figure 17B:
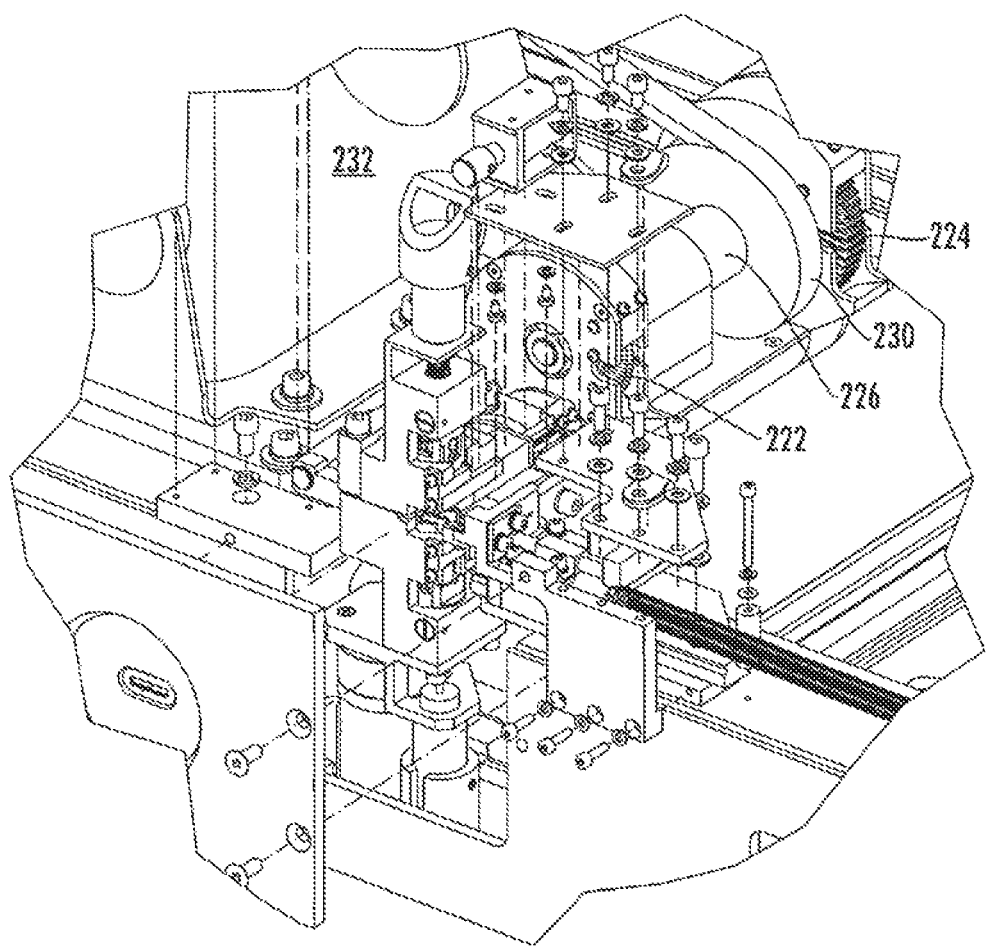
FIG. 17B is an enlarged view of the detail identified in circle 17B shown in FIG. 17A.

Key cutting module 200 is best depicted in FIGS. 14 and 17B. A cutting wheel housing 202 and a cleaning wheel housing 204 are provided, respectively mostly enclosing a cutting wheel 222 (FIG. 17B) and a cleaning brush/wheel 224 (FIG. 17B). Housings 202 and 204 are connected by a main vacuum housing 206 to a vacuum source 208. It is very important to provide a way to remove the debris caused by the cutting and cleaning processes, since there are a significant number of moving parts that can be compromised if metal shavings permeate the device.

Housings 202 and 204 do not completely surround the cutting and cleaning wheels 222 and 224 or they would be incapable of cutting and cleaning; windows 203 and 205 are provided respectively in housings 202 and 204. To maximize the focus of the negative pressure of the vacuum around the key blank being operated upon without interfering with the cutting and cleaning processes (and thus to maximize the removal of debris), flexible flaps 210, 212, and 214 are provided surrounding windows 203 and 205. Flaps 210, the distal flaps, are longer than the proximal flaps 212. This allows central positioning base 250 to move into engagement with the cutting and cleaning wheels and not inadvertently folding the flaps over the cleaning/cutting wheels. That is, the central positioning base 250 first moves against the distal flaps 210 to push them out of the way while clearing proximal flaps 212. Then the central positioning base 250 can get closer to the cutting/cleaning wheels and pushes the proximal flaps 212 out of the way.

In the preferred embodiment, cutting wheel 222 and cleaning wheel 224 are disposed on the same rotating shaft 226, which is driven by drive belt 230 attached to motor 232. Motor 232 is reversible and is reversed before the key blank is cleaned at the cleaning wheel; the rotatable shaft 226 is rotated first in one direction during cutting and then the other direction during cleaning, so as to cause the cleaning wheel 224 to remove flashes and burrs from the trailing edge of the newly cut duplicate key. Burrs and debris generally hang from the trailing edge of a newly cut key. By reversing the direction of motor 232 (and thus drive belt 230 and cleaning wheel 224), the duplicate key need not be rotated upside down or in any way removed from blank clamp 270 for extraneous material to be removed from the trailing edge.

Figure 15:
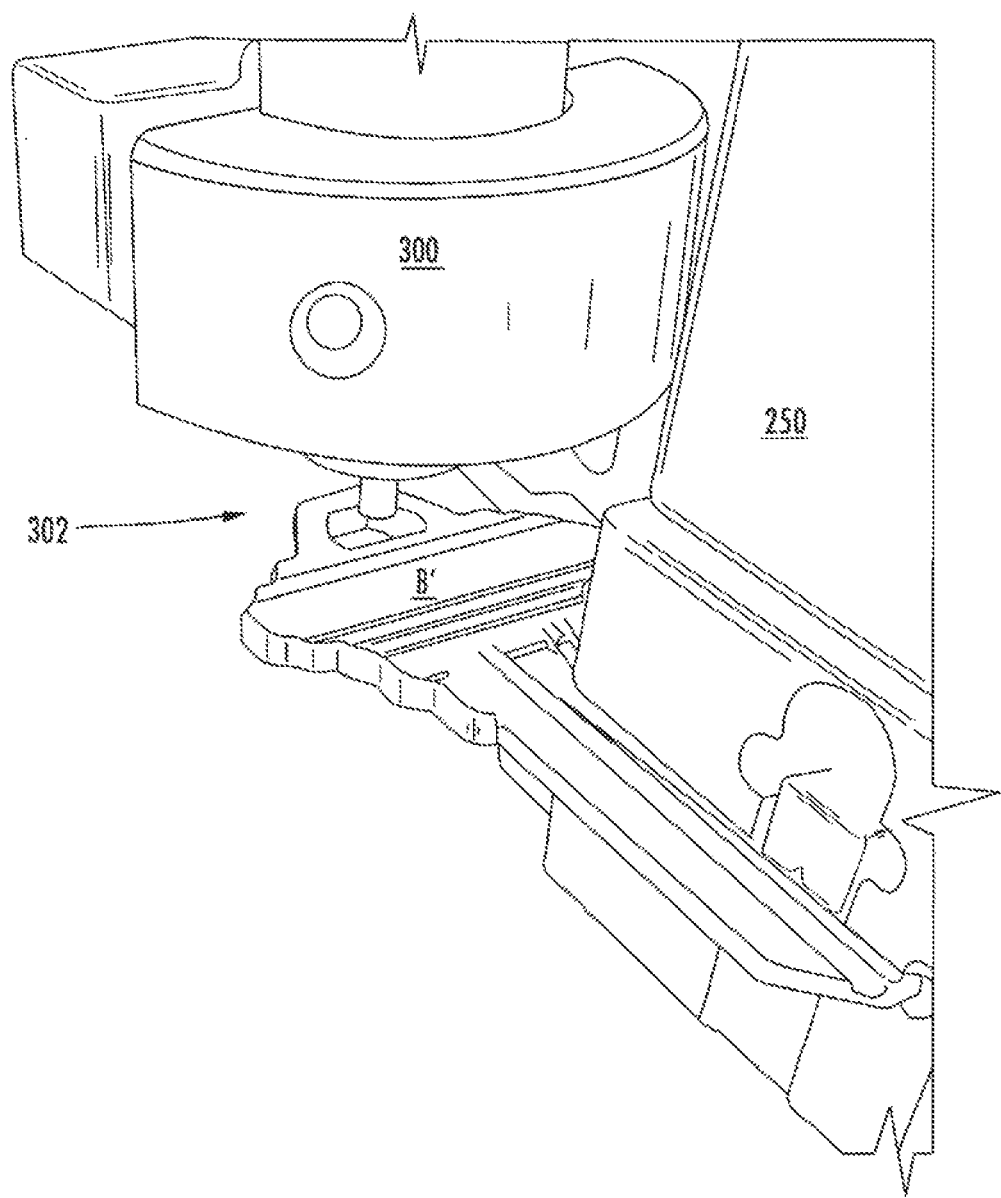
FIG. 15 is an enlarged perspective view of a mechanism for removing a finished duplicate key in accordance with the invention.

When the duplicate key is finished and ready to be removed from the machine 40, central positioning base 250 moves the key under removal base 300 as shown in FIG. 15. Removal base 300 has a pin 302 which projects into the hole of finished duplicate key B' when the key B' is so positioned. Pin 302 engages the hole of key B', blank clamp 270 releases the securing force on key B', and central positioning base 250 moves away from base 300. Because pin 302 is projecting within the hole of key B', the key slides out of blank clamp 270 and falls down a dispensing chute or into a tray (not shown).

Figure 16A:
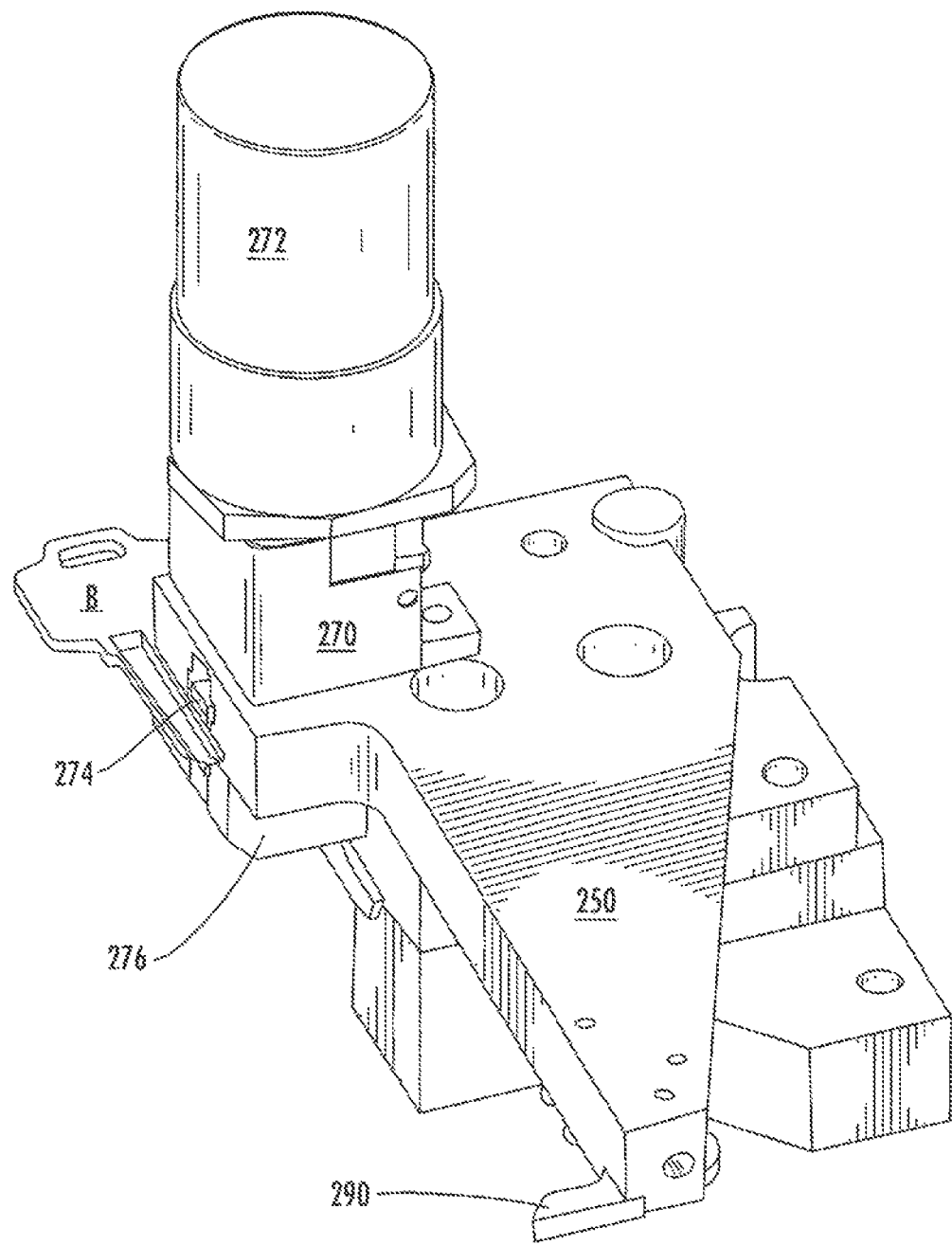
FIGS. 16A and B are top perspective and top elevation views, respectively, of a central positioning base in accordance with the invention.
Figure 16B:
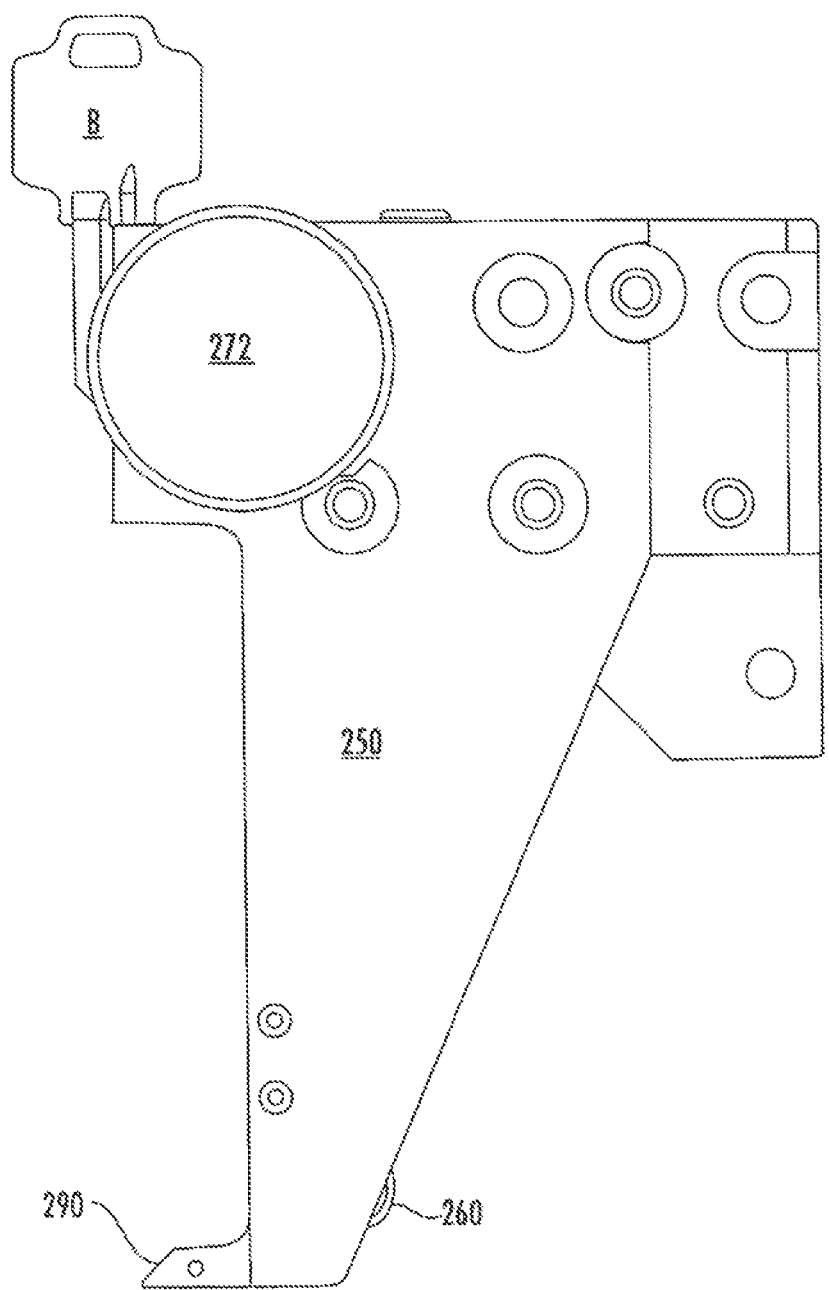
FIG. 16C is a corresponding side elevation view.
Figure 16C:
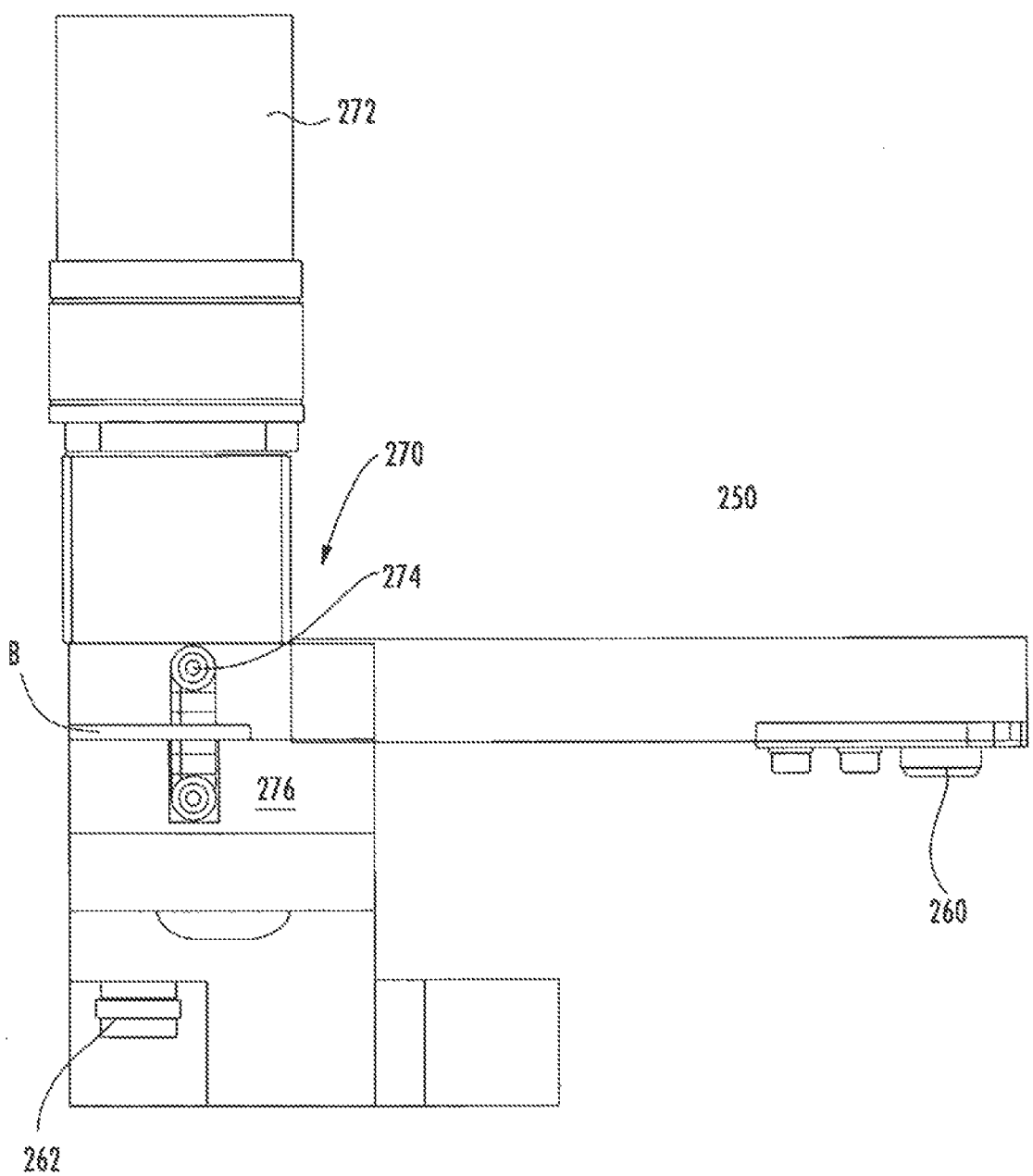

The prime mover of many of the aforementioned modules and functions of the invention is central positioning base 250, itself depicted in FIGS. 16A-C. As indicated above, base 250 has two engagement hubs 260 and 262 (see FIG. 16C) for engaging master key alignment module 50 and key blank extraction module 150, respectively, at their hub receivers 55 and 180. Base 250 also includes key blank clamp 270, having motor 272, key sensors 274 for detecting the presence of a key, and jaw 276 for securing a key blank B inserted therein. Follower tip 290 traces along the tooth pattern of the master key A secured in master key clamping module 100 while key blank B is being cut at key cutting wheel 222.

As best illustrated in FIG. 17A, central positioning base 250 is preferably movable along two rails, an X-axis rail 264 and a Y-axis rail 266. Preferably, two separate motors are provided for respective movement in the X direction and the Y direction. The X-direction motor ("X-motor") is preferably a gear box motor, and the Y-direction motor ("Y-motor") is preferably a direct drive motor. The Y-motor can be used not only to move central positioning base 250 back and forth in the Y direction but also at lower power to maintain a fixed position of central positioning base 250 or to provide pressure to the key blank during the cutting and cleaning steps of the operation. Indeed, during the cutting step, the Y-motor is provided with a variable amount of power depending on a substantially instantaneous height of the master key tooth pattern being traced so that internal play or flexion or friction of the central positioning base 250 under significant pressure does not cause distortion of base 250 and thus misalign the key blank being machined and the follower 290 tracing the master key tooth pattern. Preferably, when follower 290 rides along an uphill portion of the master key tooth pattern, the power provided to the Y-motor is reduced, and when the follower rides along a downhill portion of the master key tooth pattern, the power provided to the Y-motor is increased. In a preferred embodiment, Y-motor power while tracing uphills in the master key tooth profile is approximately 70% of Y-motor power while tracing downhills in the master key tooth profile.

The invention is not limited to the above description. For example, the alignment and identification modules are preferably used to align and identify the master key to be duplicated, however these modules could also be used to align and identify the key blank to be cut. Also, the exemplary embodiments shown above depict a central positioning base movable amongst several modules in an X-Y plane, i.e., in two dimensions. However, it is also contemplated to 'stack' the various modules vertically and have the central positioning base move in a vertical plane (a Y-Z plane, for example), or in three dimensions instead of two dimensions.

Additionally, several modules are described as fixed and others as movable. However, in most cases, the reverse may be true, as long as there is substantially similar relative movement among the modules. For example, the key blank extraction module is described and shown in the preferred embodiment as being movable along a row of fixed magazines. However, it would also be within the scope of the invention to provide a fixed extraction module and a movable bank of magazines, for example on a carousel, where the proper magazine is selectively movable into engagement with the fixed extraction module. As another alternative, any module that is shown as being passively movable by the action of the central positioning base (e.g., the master key alignment module, the key blank extraction module) may be provided with its own motor for its own independent locomotion.

Similarly, although in the preferred embodiment the key cutting wheel and key cleaning wheel are shown as being coaxial on a single shaft that can be rotated in both directions, it would also be within the scope of the invention to provide two separate rotating elements, one for the key cutter and one for the cut key cleaner. The invention is also not limited to the use of either a key cutting wheel or a key cleaning wheel per abut may instead employ other devices for cutting the key blank and for cleaning the cut key, either known now or to be developed in the future.

As another variation, the key identification module may include an optical or electronic scanning device for detecting any of the parameters of the master key, including key length, blade cross-sectional profile, and/or tooth pattern.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of duplicating a key, comprising:
storing, by a key duplicating machine, key blanks of different cross-sectional profiles;
receiving a master key in the key duplicating machine;
automatically detecting, by the key duplicating machine, a cross-sectional profile of the master key;
automatically selecting, by the key duplicating machine, from among the different stored key blanks, a key blank whose cross-sectional profile matches the automatically-detected cross-sectional profile of the master key; and
automatically cutting, by the key duplicating machine, the selected key blank to duplicate a key tooth pattern of the master key.

2. The method of claim 1, further comprising:
automatically detecting, by the key duplicating machine, a blade length of the master key.

3. The method of claim 2, further comprising:
automatically determining, by the key duplicating machine, a model of the master key based on the detected cross-sectional profile and the detected blade length.

4. The method of claim 3, wherein the selecting includes selecting the key blank that matches both the determined type and the determined model.

5. A method of duplicating a key, comprising:
receiving a master key in a key duplicating machine;
automatically detecting, by the key duplicating machine, a cross-sectional profile of the master key by the key duplicating machine attempting to close a pair of sliding elements, having a profile of a particular type of key, around a blade of the master key, and determining that the master key is of the particular type based on the sliding elements successfully closing around the blade;
automatically determining, by the key duplicating machine, a type of the master key based on the detected cross-sectional profile of the master key;
automatically selecting, by the key duplicating machine, a key blank that matches the type of the master key; and
automatically cutting, by the key duplicating machine, the selected key blank to duplicate a key tooth pattern of the master key.

6. A method of duplicating a key, comprising:
receiving a master key in a key duplicating machine;
automatically detecting, by the key duplicating machine, a blade length of the master key by a blade length sensor of the key duplicating machine abutting a distal end of a master key;
automatically detecting, by the key duplicating machine, a cross-sectional profile of the master key;
automatically determining, by the key duplicating machine, a type of the master key based on the detected cross-sectional profile of the master key;
automatically selecting, by the key duplicating machine, a key blank that matches the type of the master key; and
automatically cutting, by the key duplicating machine, the selected key blank to duplicate a key tooth pattern of the master key.

7. A method of duplicating a key, comprising:
receiving a master key in a key duplicating machine;
automatically detecting, by the key duplicating machine, a blade length of the master key including detecting a location of a shoulder of the master key;
automatically detecting, by the key duplicating machine, a cross-sectional profile of the master key;
automatically determining, by the key duplicating machine, a type of the master key based on the detected cross-sectional profile of the master key;
automatically selecting, by the key duplicating machine, a key blank that matches the type of the master key; and
automatically cutting, by the key duplicating machine, the selected key blank to duplicate a key tooth pattern of the master key.

8. The method of claim 7, wherein the detecting of the location of the shoulder is implemented by the shoulder abutting a master key shoulder detecting switch of the key duplicating machine when the master key is at the location.

9. A key duplicating machine comprising:
a storage housing configured to store key blanks of different cross-sectional profiles;
a blade cross-section detector configured to automatically detect a cross-sectional profile of a master key;
a blank loading system configured to automatically select, from among the different stored key blanks, a key blank whose cross-sectional profile matches the automatically-detected cross-sectional profile of the master key; and
a key cutting system configured to cut the selected key blank to duplicate a key tooth pattern of the master key.

10. The key duplicating machine of claim 9, further comprising:
a blade length sensor configured to detect a blade length of the master key.

11. The key duplicating machine of claim 10, wherein the master key identification system is configured to determine a model of the master key based on the detected cross-sectional profile and the detected blade length.

12. The key duplicating machine of claim 11, wherein the blank loading system is configured to select the key blank that matches both the determined type and the determined model.

13. A key duplicating machine comprising:
a blade cross-section detector configured to detect a cross-sectional profile of a master key based on the blade cross-section detector attempting to close a pair of sliding elements, having a profile of a particular type of key, around a blade of the master key, and determining that the master key is of the particular type based on the sliding elements successfully closing around the blade;

a master key identification system configured to determine a type of the master key based on the detected cross-sectional profile of the master key;

a blank loading system configured to select a key blank that matches the type of the master key; and a key cutting system configured to cut the selected key blank to duplicate a key tooth pattern of the master key.

14. A key duplicating machine comprising:

a blade length sensor configured to detect a blade length of a master key by the blade length sensor abutting a distal end of a master key;

a blade cross-section detector configured to detect a cross-sectional profile of the master key;

a master key identification system configured to determine a type of the master key based on the detected cross-sectional profile of the master key;

a blank loading system configured to select a key blank that matches the type of the master key; and a key cutting system configured to cut the selected key blank to duplicate a key tooth pattern of the master key.

15. A key duplicating machine comprising:

a blade length sensor configured to detect a blade length of a master key including detecting a location of a shoulder of the master key;

a blade cross-section detector configured to detect a cross-sectional profile of the master key;

a master key identification system configured to determine a type of the master key based on the detected cross-sectional profile of the master key;

a blank loading system configured to select a key blank that matches the type of the master key; and a key cutting system configured to cut the selected key blank to duplicate a key tooth pattern of the master key.

16. The key duplicating machine of claim 15, further comprising a master key shoulder detecting switch, wherein the detecting of the location of the shoulder is implemented by the shoulder, of the master key, abutting the master key shoulder detecting switch when the master key is at the location.

17. The method of claim 2, wherein the automatically selecting includes:

automatically selecting, by the key duplicating machine, a key blank from among the different stored key blanks, based on a match between the cross-sectional profile and blade length of the key blank and the detected cross-sectional profile and detected blade length of the master key.

18. The machine of claim 10, wherein the loading system is configured to automatically select a key blank from among the different stored key blanks, based on a match between the cross-sectional profile and blade length of the key blank and the detected cross-sectional profile and detected blade length of the master key.

* * * * *